United States Patent
Kuzuhara et al.

(10) Patent No.: US 7,038,744 B2
(45) Date of Patent: May 2, 2006

(54) POLARIZING PLATE HAVING A STRETCHED FILM ON A SIDE THEREOF AND LIQUID CRYSTAL DISPLAY EMPLOYING THE SAME

(75) Inventors: Noriyasu Kuzuhara, Hino (JP); Koji Tasaka, Hino (JP); Hiroki Umeda, Hino (JP); Takatoshi Yajima, Hino (JP)

(73) Assignee: Konica Corporation, Tokyo (JP)

( * ) Notice: Subject to any disclaimer, the term of this patent is extended or adjusted under 35 U.S.C. 154(b) by 149 days.

(21) Appl. No.: 10/309,640

(22) Filed: Dec. 4, 2002

(65) Prior Publication Data
US 2003/0156235 A1 Aug. 21, 2003

(30) Foreign Application Priority Data
Jan. 9, 2002 (JP) .............................. 2002-002277

(51) Int. Cl.
*G02F 1/1335* (2006.01)

(52) U.S. Cl. .................. 349/96; 349/117; 349/118; 349/119; 428/1.3; 428/1.31; 428/1.33

(58) Field of Classification Search .................. 349/96, 349/98, 117–121; 428/1.1, 1.3, 1.31, 1.33
See application file for complete search history.

(56) References Cited

U.S. PATENT DOCUMENTS

| | | | |
|---|---|---|---|
| 6,211,358 B1 * | 4/2001 | Honda et al. .................. 536/64 |
| 6,380,996 B1 * | 4/2002 | Yokoyama et al. ......... 349/117 |
| 6,649,231 B1 * | 11/2003 | Ito .............................. 428/1.3 |
| 6,710,830 B1 * | 3/2004 | Yano et al. .................... 349/96 |
| 2004/0036828 A1 * | 2/2004 | Aminaka et al. ............ 349/117 |
| 2004/0052977 A1 * | 3/2004 | Ogawa et al. ............... 428/1.1 |

* cited by examiner

*Primary Examiner*—Andrew Schechter
*Assistant Examiner*—Michael H. Caley
(74) *Attorney, Agent, or Firm*—Lucas & Mercanti LLP

(57) ABSTRACT

A polarizing plate used in a vertical alignment mode liquid crystal display comprising a liquid crystal cell is disclosed, wherein the polarizing plate comprises a polarizing film and a mixed fatty acid cellulose ester film with optical biaxiality provided between the polarizing film and the liquid crystal cell, and wherein the mixed fatty acid cellulose ester film has a retardation in plane R0 of from 31 to 120 nm, and a retardation in the thickness direction Rt of from 60 to 300 nm, in which R0 is represented by the following formula (1) and Rt is represented by the following formula (2):

$$R0 = (nx - ny) \times d \qquad \text{formula (1)}$$

$$Rt = \{(nx + ny)/2 - nz\} \times d \qquad \text{formula (2)}$$

21 Claims, 2 Drawing Sheets

POLARIZING PLATE HAVING A STRETCHED FILM ON A SIDE THEREOF AND LIQUID CRYSTAL DISPLAY EMPLOYING THE SAME

FIELD OF THE INVENTION

The present invention relates to a polarizing plate employing as a protective film a film used for optical purposes having a phase difference function and a liquid crystal display employing the polarizing plate.

BACKGROUND OF THE INVENTION

A liquid crystal display operates at low voltage as well as low power consumption, and further, can be directly connected to an IC circuit. Specifically, it is possible to decrease its thickness. As a result, it is widely employed in word processors, personal computers, and the like, as the display. The basic structure of said liquid crystal display is such that polarizing plates are provided on the both sides of the liquid crystal cell.

A liquid crystal display has characteristics in that it operates at low voltage as well as at low power consumption, and decreases its thickness, which other displays do not have. Problem of the liquid crystal display is one in which a viewing angle is small. Solution of the problem has been eagerly required, and technique to solve this problem has been developed. As the technique, there has been proposed an optical compensation film comprising an optically anisotropic layer containing a discotic liquid crystal compound obliquely oriented, which is provided on a polarizing plate of a TN (TN-TFT) mode liquid crystal display. However, further wide viewing angle in, for example, has been increasingly demanded year by year.

As one of the means solving the above problems, there has been proposed a liquid crystal of type different from a TN or STN type liquid crystal. A vertical alignment (VA) mode liquid crystal, for example, a negative liquid crystal having a negative dielectric anisotropy, has been developed, in which when no voltage is applied, liquid crystal molecules are oriented vertical to the orientation plate, while when voltage is applied, they are oriented parallel to the orientation plate. In the TN or STN type liquid crystal, when no voltage is applied, liquid crystal molecules are oriented parallel to the orientation plate, while when voltage is applied, they are oriented vertical to the orientation plate. A VA mode liquid crystal display comprises a liquid crystal cell with a vertical alignment mode in which when no voltage is applied, liquid crystal molecules are oriented vertical to the orientation plate, while when voltage is applied, they are oriented parallel to the orientation plate.

This VA mode liquid crystal display comprises a liquid crystal cell with a vertical alignment mode in which when no voltage is applied, liquid crystal molecules are oriented vertical to the orientation plate, while when voltage is applied, they are oriented parallel to the orientation plate. As a result, in such a liquid crystal display, black is displayed as genuine black, and contrast increases. Particularly in a VA mode liquid crystal display multi-divided, it has been possible to obtain a viewing angle of 160° at the upper, lower, left and right portions of the display. However, as the size of a liquid crystal display increases, further increase of the viewing angle, particularly the viewing angle in the oblique direction of 45° (in the direction of 45°, 135°, 225°, 315°) has been increasingly demanded.

In order to increase the viewing angle of the VA mode liquid crystal display, the present inventors has made an extensive study on a polarizing plate protective film. During the course of the investigation, and as a result, they have found that when a film is employed in which an retardation value (Rt value) in the thickness direction, showing anisotropy in the in-plane direction as well as in the thickness direction, is adjusted to a positive value, that is, a so-called C-plate in which anisotropy in plane is adjusted to a minimum, and a retardation in the thickness direction to a specific range, is used, the viewing angle of the VA mode liquid crystal display further increases (Japanese Patent O.P.I. Publication No. 2001-188128). However, this method could not prevent the thickness from increasing, although it is smaller in the thickness as compared with those in which a predetermined Rt is obtained by laminating plural conventional polarizing plate protective films.

It is known that insertion of a phase difference plate with optical biaxiality of a resin such as polycarbonate between a polarizing plate and a liquid crystal cell increases the viewing angle described above, the optical biaxiality being provided by biaxially stretching the phase difference plate, and for example, "VAC film" produced by Sumitomo Kagaku Co., Ltd. is available on the market. However, a phase difference plate of a resin such as polycarbonate has problems in uniformity of phase difference or in transmittance, and is required to be laminated onto a polarizing plate every piece, which results in problems in productivity or cost of manufacture.

An optical film, particularly a polarizing plate protective film is required to have resistance to heat or humidity, which prevents its shrinkage or deterioration due to moisture absorption of a polarizer at high temperature and high humidity, and separation the polarizing plate from a glass plate of the liquid crystal cell due to deterioration of the adhesive used. Further, the optical film is required to have high transparency, high strength, or ease of handling.

Further, when cellulose ester film is produced by dissolving cellulose ester and casting the resulting solution, cellulose ester in which the esterification has been insufficient tends to remain in the film as insoluble foreign materials. When such a film is incorporated to a liquid crystal display element, the insoluble foreign materials causes defects that disturb the polarizing state to emit abnormal light due to its difference in the refractive index from cellulose ester film, so-called defects due to luminescent foreign materials. These defects have been less problematic in a TN mode (TN-TFT) liquid crystal display, which is an optical rotatory mode, but it has been found that they are problems to be solved in a VA mode liquid crystal display, which is a birefringence mode.

Japanese Patent O.P.I. Publication No. 9-90101 proposes that casting can be carried out employing a solvent other than chlorine-containing hydrocarbons as the solvent, where incorporating a specific amount of an acetyl group or a propionyl group to cellulose to obtain a cellulose ester, selection range of the solvent of the cellulose ester increases, and also proposes that fatty acid cellulose esters having a low retardation value in both in-plane and thickness directions are used for the purpose such that high contrast of a TFT mode or FSTN mode liquid crystal display realizing high contrast is not jeopardized.

However, when used in the VA mode liquid crystal display, any proposals described above are not satisfactory in view of resistance to heat and humidity, the number of foreign materials occurring or increase in viewing angle. Further improvement is required.

SUMMARY OF THE INVENTION

The present invention has been made in view of the above. Accordingly, one aspect of the present invention is to provide a polarizing plate having high resistance to heat or humidity, high strength, and minimized foreign materials, and a liquid crystal display employing the polarizing plate. Another aspect of the present invention is to provide a polarizing plate giving wide viewing angle and a liquid crystal display employing the polarizing plate.

DETAILED DESCRIPTION OF THE INVENTION

Figure 1:
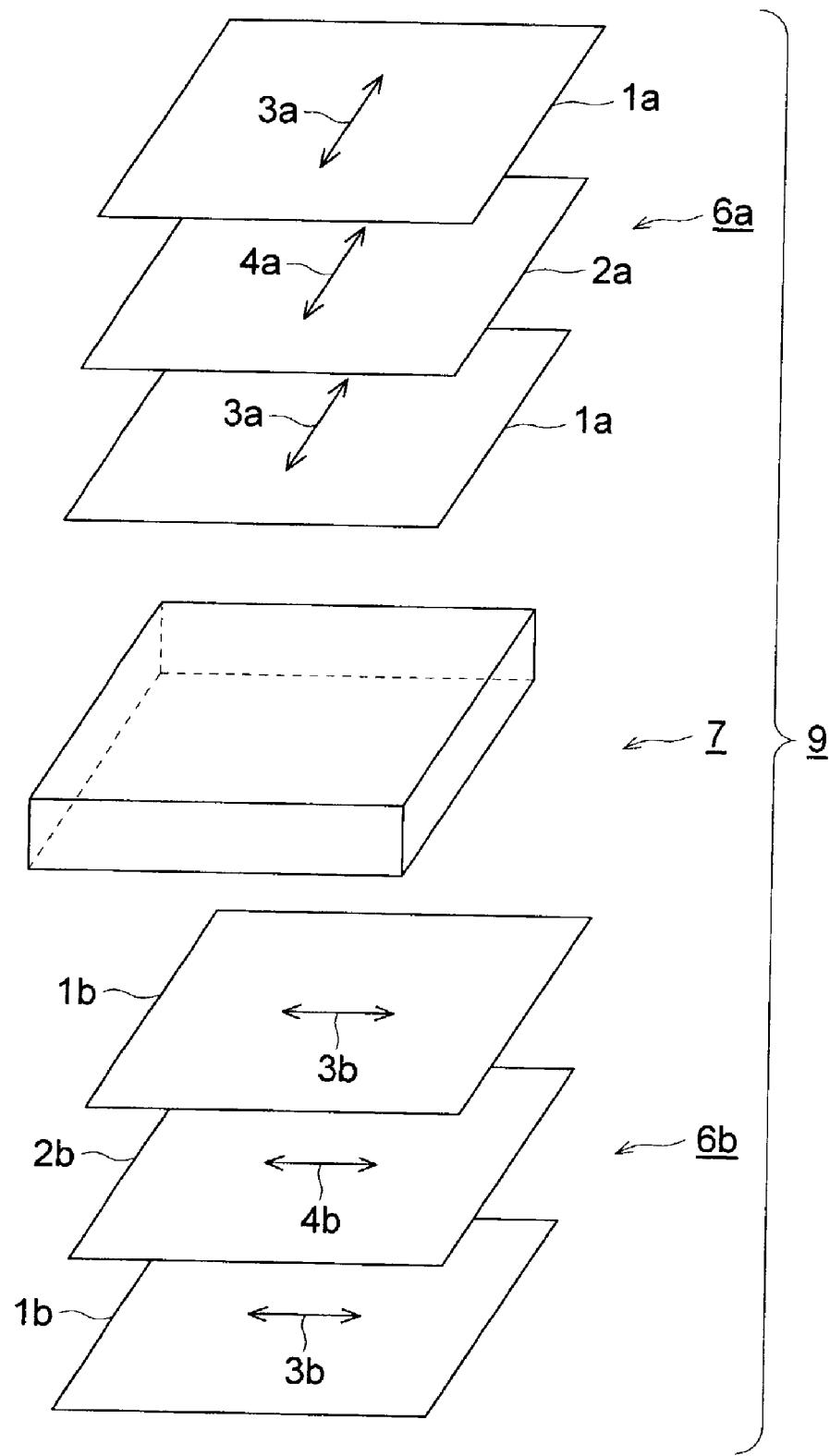
FIG. 1 is an illustration showing the constitution of the liquid crystal display of the invention.

The present invention can be attained by the following constitutions:

1. A polarizing plate used in a vertical alignment mode liquid crystal display comprising a liquid crystal cell, the polarizing plate comprising a polarizing film and a mixed fatty acid cellulose ester film with optical biaxiality provided between the polarizing film and the liquid crystal cell, wherein the mixed fatty acid cellulose ester film has a retardation in plane R0 of from 31 to 120 nm, and a retardation in the thickness direction Rt of from 60 to 300 nm, in which R0 is represented by the following formula (1) and Rt is represented by the following formula (2):

$$R0 = (nx - ny) \times d \qquad \text{formula (1)}$$

$$Rt = \{(nx+ny)/2 - nz\} \times d \qquad \text{formula (2)}$$

wherein nx is refractive index in plane of the film in a first direction giving a maximum refractive index, ny is refractive index in plane of the film in a second direction normal to the first direction, nz is refractive index in the thickness direction of the film, and d is thickness (nm) of the film.

2. The polarizing plate of item 1 above, wherein the mixed fatty acid cellulose ester film has a retardation in plane R0 of from 31 to 60 nm, and a retardation in the thickness direction Rt of from 90 to 200 nm.

3. The polarizing plate of item 2 above, wherein the mixed fatty acid cellulose ester film has a retardation in plane R0 of from 31 to 50 nm, and a retardation in the thickness direction Rt of from 110 to 150 nm.

4. The polarizing plate of item 1 above, wherein the mixed fatty acid cellulose of the mixed fatty acid cellulose ester film has an acetyl group and a propionyl group in the ester bond.

5. The polarizing plate of item 1 above, wherein the mixed fatty acid cellulose ester of the mixed fatty acid cellulose ester film has an acetyl group and a butyryl group in the ester bond.

6. The polarizing plate of item 1 above, wherein the mixed fatty acid cellulose ester film has a thickness of from 30 to 110 μm.

7. The polarizing plate of item 1 above, wherein the mixed fatty acid cellulose ester of the mixed fatty acid cellulose ester film has a total acyl substitution degree of from 1.2 to 2.8.

8. The polarizing plate of item 4 above, wherein the mixed fatty acid cellulose ester has a total acyl substitution degree of from 1.5 to 2.3, and a propionyl substitution degree of from 0.6 to 1.2.

9. The polarizing plate of item 7 above, wherein the mixed fatty acid cellulose ester has an acetyl substitution degree of less than 2.0.

10. The polarizing plate of item 8 above, wherein the mixed fatty acid cellulose ester has an acetyl substitution degree of less than 2.0.

11. The polarizing plate of item 1 above, wherein cellulose triacetate film is provided on the surface of the polarizing film opposite the mixed fatty acid cellulose ester film.

12. The polarizing plate of item 1 above, wherein the angle formed between the orientation direction of a dichroic substance in the polarizing film and the direction giving a maximum refractive index in plane of the mixed fatty acid cellulose ester film is in the range of from 80° to 100°.

13. The polarizing plate of item 1 above, wherein the angle formed between the orientation direction of a dichroic substance in the polarizing film and the direction giving a maximum refractive index in plane of the mixed fatty acid cellulose ester film is in the range of from 0 to 10°.

14. The polarizing plate of item 1 above, wherein the mixed fatty acid cellulose ester film is provided on a first surface of the polarizing film, and a cellulose ester film is provided on a second surface of the polarizing film opposite the mixed fatty acid cellulose ester film, the stretching direction of the mixed fatty acid cellulose ester film being in accordance with that of the cellulose ester film provided on the second surface of the polarizing film.

15. The polarizing plate of item 14 above, wherein the cellulose ester film provided on the second surface of the polarizing film has been stretched in the transverse direction during or after manufacture.

16. The polarizing plate of item 15 above, wherein the cellulose ester film provided on the second surface of the polarizing film has been stretched at a stretching magnification of from 1.01 to 1.2.

17. The polarizing plate of item 16 above, wherein the cellulose ester film provided on the second surface of the polarizing film has been stretched at a stretching magnification of from 1.05 to 1.15.

18. The polarizing plate of item 14 above, wherein the cellulose ester film on the other side of the polarizing film is a triacetyl cellulose ester film.

19. The polarizing plate of item 1 above, wherein when the mixed fatty acid cellulose ester film is arranged in a crossed Nicol state, and luminescent foreign materials are observed, the number of luminescent foreign materials with a size of from 5 to 50 μm is not more than 150 per 250 mm² of the film, and the number of luminescent foreign materials with a size exceeding 50 μm is zero per 250 mm² of the film.

20. The polarizing plate of item 1 above, wherein the mixed fatty acid cellulose ester film is manufactured by a process comprising the steps of giving optical biaxiality to a long length mixed fatty acid cellulose ester film, and winding the resulting film around a spool to obtain a long length roll film.

21. The polarizing plate of item 1 above, wherein the polarizing plate is manufactured by a process comprising the steps of giving optical biaxiality to a long length mixed fatty acid cellulose ester film, treating the film to give a maximum refractive index in the transverse direction of the film, winding the resulting film around a spool to obtain a roll film, providing a polarizing film containing a dichroic substance, and laminating the polarizing film onto the roll film.

22. The polarizing plate of item 21 above, wherein the optical biaxiality giving step is a step in which the long length mixed fatty acid cellulose ester film is stretched in the transverse direction of the film when it has a residual solvent content of not less than 10% by weight during manufacture.

23. The polarizing plate of item 1 above, wherein the mixed fatty acid cellulose ester film contains 1 to 30 parts by weight of at least one plasticizer selected from the group consisting of a phosphate compound, a fatty acid ester compound, a citrate compound, and a phthalate compound based on 100 parts by weight of the cellulose ester.

24. The polarizing plate of item 1 above, wherein the mixed fatty acid cellulose ester film contains 0.005 to 0.3 parts by weight of particles having an average particle size of not more than 0.1 μm, based on 100 parts by weight of the cellulose ester.

25. The polarizing plate of item 1 above, wherein the mixed fatty acid cellulose ester film contains 0.8 to 3.0 parts by weight of a UV absorber based on 100 parts by weight of the cellulose ester.

26. A liquid crystal display comprising a polarizing film A, a polarizing film B, and a vertical alignment mode liquid crystal cell provided between the polarizing films A and B, one or more cellulose ester films A being provided between the polarizing film A and the liquid crystal cell, and one or more cellulose ester films B between the polarizing film B and the liquid crystal cell, wherein 31 nm≦Σ R0≦120 nm, and 60 nm≦Σ Rt≦300 nm, in which Σ R0=Σ R0(A)+Σ R0(B), and Σ Rt=Σ Rt(A)+Σ Rt(B), Σ R0(A) being the sum of retardation in plane of each of the cellulose ester films A, Σ R0(B) the sum of retardation in plane of each of the cellulose ester films B, Σ Rt(A) the sum of retardation in the thickness direction of each of the cellulose ester films A, and Σ Rt(B) the sum of retardation in the thickness direction of each of the cellulose ester films B.

27. The liquid crystal display of item 26 above, wherein at least one of the cellulose ester films A and B is a mixed fatty acid cellulose ester film having a retardation in plane R0 of from 31 to 120 nm, and a retardation in the thickness direction Rt of from 60 to 300 nm, in which R0 is represented by the following formula (1) and Rt is represented by the following formula (2):

$$R0 = (nx - ny) \times d \quad \text{formula (1)}$$

$$Rt = \{(nx + ny)/2 - nz\} \times d \quad \text{formula (2)}$$

wherein nx is refractive index in plane of the film in a first direction giving a maximum refractive index, ny is refractive index in plane of the film in a second direction normal to the first direction, nz is refractive index in the thickness direction of the film, and d is thickness (nm) of the film.

28. The liquid crystal display of item 27 above, wherein the mixed fatty acid cellulose ester has an acetyl group and a propionyl group or a butyryl group in the ester bond in the molecule.

29. The liquid crystal display of item 27 above, wherein the mixed fatty acid cellulose ester film has a total acyl substitution degree of from 1.2 to 2.8.

30. The liquid crystal display of item 27 above, wherein the mixed fatty acid cellulose ester film has a total acyl substitution degree of from 1.5 to 2.3, and a propionyl substitution degree of from 0.6 to 1.2.

31. The liquid crystal display of item 27 above, wherein the angle formed between the orientation direction of a dichroic substance in the polarizing film and the direction giving a maximum refractive index in plane of the mixed fatty acid cellulose ester film is in the range of from 80° to 100°.

32. The liquid crystal display of item 27 above, wherein the angle formed between the orientation direction of a dichroic substance in the polarizing film and the direction giving a maximum refractive index in plane of the mixed fatty acid cellulose ester film is in the range of from 0 to 10°.

33. The liquid crystal display of item 27 above, wherein the mixed fatty acid cellulose ester film is provided on a first surface of the polarizing film, and a cellulose ester film is provided on a second surface of the polarizing film opposite the mixed fatty acid cellulose ester film, the stretching direction of the mixed fatty acid cellulose ester film being in accordance with that of the cellulose ester film provided on the second surface of the polarizing film.

34. The liquid crystal display of item 27 above, wherein the cellulose ester film provided on the second surface of the polarizing film has been stretched in the transverse direction during or after manufacture.

35. The liquid crystal display of item 27 above, wherein when the mixed fatty acid cellulose ester film is arranged in a crossed Nicol state, and luminescent foreign materials are observed, the number of luminescent foreign materials with a size of from 5 to 50 μm is not more than 150 per 250 mm² of the film, and the number of luminescent foreign materials with a size exceeding 50 μm is zero per 250 mm² of the film.

36. The liquid crystal display of item 27 above, wherein the mixed fatty acid cellulose ester film contains 0.005 to 0.3 parts by weight of particles having an average particle size of not more than 0.1 μm, based on 100 parts by weight of the cellulose ester.

37. The liquid crystal display of item 26 above, wherein 60 nm≦Σ R0≦120 nm, and 100 nm≦Σ Rt<300 nm.

38. A vertical alignment mode liquid crystal display comprising a polarizing plate and a liquid crystal cell, the polarizing plate comprising a polarizing film and a mixed fatty acid cellulose ester film with optical biaxiality provided between the polarizing film and the liquid crystal cell, wherein the mixed fatty acid cellulose ester film has a retardation in plane R0 of from 31 to 120 nm, and a retardation in the thickness direction Rt of from 60 to 300 nm, in which R0 is represented by the following formula (1) and Rt is represented by the following formula (2):

$$R0 = (nx - ny) \times d \quad \text{formula (1)}$$

$$Rt = \{(nx + ny)/2 - nz\} \times d \quad \text{formula (2)}$$

wherein nx is refractive index in plane of the film in a first direction giving a maximum refractive index, ny is refractive index in plane of the film in a second direction normal to the first direction, nz is refractive index in the thickness direction of the film, and d is thickness (nm) of the film.

101. A polarizing plate used in a vertical alignment mode liquid crystal display comprising a liquid crystal cell, the polarizing plate comprising a polarizing film and a mixed fatty acid cellulose ester film with optical biaxiality, wherein the fatty acid cellulose ester film is provided between the polarizing film and the liquid crystal cell.

102. The polarizing plate of item 101 above, wherein the mixed fatty acid cellulose ester film has a retardation in plane R0 of from 31 to 120 nm, and a retardation in the thickness direction Rt of from 60 to 300 nm, in which R0 is represented by formula (1) and Rt is represented by formula (2).

103. The polarizing plate of item 101 above, wherein the mixed fatty acid cellulose ester film has a retardation in plane R0 of from 31 to 60 nm, and a retardation in the thickness direction Rt of from 90 to 200 nm.

104. The polarizing plate of item 101 above, wherein the mixed fatty acid cellulose ester film has a retardation in plane R0 of from 31 to 50 nm, and a retardation in the thickness direction Rt of from 110 to 150 nm.

105. The polarizing plate of any one of items 1 through 4 above, wherein the mixed fatty acid cellulose ester has an acetyl group and a propionyl group in the ester bond.

106. The polarizing plate of any one of items 101 through 104 above, wherein the mixed fatty acid cellulose ester has an acetyl group and a butyryl group in the ester bond.

107. The polarizing plate of any one of items 101 through 106 above, wherein the mixed fatty acid cellulose ester film has a thickness of from 30 to 110 μm.

108. The polarizing plate of any one of items 101 through 105 above and item 107, wherein the mixed fatty acid cellulose ester film has a total acyl substitution degree of from 1.2 to 2.8.

109. The polarizing plate of item 105 or 107 above, wherein the mixed fatty acid cellulose ester film has a total acyl substitution degree of from 1.5 to 2.3, and a propionyl substitution degree of from 0.6 to 1.2.

110. The polarizing plate of item 108 or 109 above, wherein the mixed fatty acid cellulose ester film has an acetyl substitution degree of less than 2.0.

111. The polarizing plate of any one of items 101 through 110 above, wherein cellulose triacetate film is provided on the surface of the polarizing film opposite the mixed fatty acid cellulose ester film.

112. The polarizing plate of any one of items 101 through 111 above, wherein the angle formed between the orientation direction of a dichroic substance in the polarizing film and the direction giving a maximum refractive index in plane of the mixed fatty acid cellulose ester film is in the range of from 80° to 100°.

113. The polarizing plate of any one of items 101 through 112 above, wherein the angle formed between the orientation direction of a dichroic substance in the polarizing film and the direction giving a maximum refractive index in plane of the mixed fatty acid cellulose ester film is in the range of from −10° to 10°.

114. The polarizing plate of any one of items 101 through 113 above, wherein the mixed fatty acid cellulose ester film is provided on a first surface of the polarizing film, and the mixed fatty acid cellulose ester film or another cellulose ester film B is provided on a second surface of the polarizing film opposite the mixed fatty acid cellulose ester film, the stretching direction of the mixed fatty acid cellulose ester film being in accordance with that of the cellulose ester film B.

115. The polarizing plate of item 114 above, wherein the cellulose ester film B has been stretched in the transverse direction during or after manufacture.

116. The polarizing plate of item 114 or 115 above, wherein the cellulose ester film B has been stretched at a stretching magnification of from 1.01 to 1.2.

117. The polarizing plate of item 14 or 15 above, wherein the cellulose ester film B has been stretched at a stretching magnification of from 1.05 to 1.15.

118. The polarizing plate of any one of items 114 through 117 above, wherein the cellulose ester film B is a triacetyl cellulose ester film.

119. The polarizing plate of any one of items 101 through 118 above, wherein when the mixed fatty acid cellulose ester film is arranged in a crossed Nicol state, and luminescent foreign materials are observed, the number of luminescent foreign materials with a size of from 5 to 50 μm is not more than 150 per 250 mm$^2$ of the film, and the number of luminescent foreign materials with a size exceeding 50 μm is zero per 250 mm$^2$ of the film.

120. The polarizing plate of any one of items 101 through 119 above, wherein the mixed fatty acid cellulose ester film is manufactured by a process comprising the steps of giving optical biaxiality to a long length mixed fatty acid cellulose ester film, and winding the resulting film around a spool to obtain a long length roll film.

121. The polarizing plate of any one of items 101 through 120 above, wherein the polarizing plate is manufactured by a process comprising the steps of giving optical biaxiality to a long length film of a mixed fatty acid cellulose ester film, adjusting the resulting film to obtain a maximum refractive index in the transverse direction of the film, winding the resulting film around a spool to obtain a long length roll film, providing a polarizing film containing a dichroic substance; and laminating the polarizing film onto the roll film.

122. The polarizing plate of item 121 above, wherein the optical biaxiality giving step is a step in which the long length film is stretched in the transverse direction of the film when it has a residual solvent content of not less than 10% by weight during manufacture.

123. The polarizing plate of any one of items 101 through 122 above, wherein the mixed fatty acid cellulose ester film contains 1 to 30 parts by weight of at least one plasticizer selected from the group consisting of a phosphate compound, a fatty acid ester compound, a citrate compound, and a phthalate compound based on 100 parts by weight of the cellulose ester.

124. The polarizing plate of any one of items 101 through 123 above, wherein the mixed fatty acid cellulose ester film contains 0.005 to 0.3 parts by weight of particles having an average particle size of not more than 0.1 μm, based on 100 parts by weight of the cellulose ester.

125. The polarizing plate of any one of items 101 through 124 above, wherein the mixed fatty acid cellulose ester film contains 0.8 to 3.0 parts by weight of a UV absorber based on 100 parts by weight of the cellulose ester.

126. A liquid crystal display comprising a polarizing film A, a polarizing film B, and a vertical alignment mode liquid crystal cell provided between the polarizing films A and B, one or more cellulose ester films A only being provided between the polarizing film A and the liquid crystal cell, and one or more cellulose ester films B only being provided between the polarizing film B and the liquid crystal cell, wherein 31 nm$\leq \Sigma$ R0$\leq$120 nm, and 60 nm$\leq \Sigma$ Rt$\leq$300 nm, in which $\Sigma$ R0=$\Sigma$ R0(A)+$\Sigma$ R0(B), and $\Sigma$ Rt=$\Sigma$ Rt(A)+$\Sigma$ Rt(B), $\Sigma$ R0(A) being the sum of retardation in plane of each of the cellulose ester films A, $\Sigma$ R0(B) the sum of retardation in plane of each of the cellulose ester films B, $\Sigma$ Rt(A) the sum of retardation in the thickness direction of each of the cellulose ester films A, and $\Sigma$ Rt(B) the sum of retardation in the thickness direction of each of the cellulose ester films B.

127. The liquid crystal display of item 126 above, having the polarizing plate of any one of items 101 through 125 on at least one surface of the liquid crystal cell, wherein the mixed fatty acid cellulose ester film is provided between the polarizing film and the liquid crystal cell.

128. The liquid crystal display of item 119 or 120 above, wherein 60 nm$\leq \Sigma$ R0$\leq$120 nm, and 100 nm$\leq \Sigma$ Rt$\leq$300 nm.

The present invention will be explained in detail below.

First, a cellulose ester film used in the polarizing plate of the invention will be explained.

A conventional phase difference film with a biaxially oriented property used in a VA mode liquid crystal display is a film in which a liquid crystal compound is uniformly coated on a transparent substrate and oriented or a film in which a resin such as a polycarbonate is oriented employing a complex orientation technique. This optical film with a complex optical anisotropy is laminated to a polarizing plate. The present inventors have found a polarizing plate employing, as a polarizing plate protective film, a mixed fatty acid cellulose ester film (hereinafter referred to also as cellulose ester film in the invention) with optical biaxiality in the invention, which possesses a sufficient optical compensation property and maintains a stable optical compensation property at high temperature and high humidity. Examples of the polarizing plate of the invention include a so-called elliptic polarizing plate with a phase difference function.

It has been found that a polarizing plate employing the cellulose ester film in the invention exhibits an excellent optical compensation property that provides high contrast, wide viewing angle, and minimized color variation, when viewing from an oblique direction.

The cellulose ester film used in the polarizing plate of the invention having an effect of increasing a viewing angle has characteristics in that it has optical biaxiality. In the cellulose ester film, such optical biaxiality can be obtained by carrying out uniaxially stretching, and biaxial stretching is not necessary. This is considered to show that the cellulose ester film itself has a negative uniaxial property (nX=nY>nZ, in which nX represents refractive index in plane in the X direction of the film, nY represents refractive index in plane in the Y direction of the film, and nZ represents refractive index in the thickness direction of the film).

The cellulose ester film in the invention having optical biaxiality can be used as a protective film of the polarizing plate on a liquid crystal cell side (between a dichroic substance constituting the polarizing plate and the liquid crystal cell). A support of the dichromatic substance opposite the liquid crystal cell (on the viewer side) is not optically restricted, and a conventional cellulose triacetate film (hereinafter referred to also as TAC film) can be used as the protective film. In this case, a TAC film, which has been stretched as a minimum in the transverse direction by a specific stretching magnification, can provide an excellent elliptic polarizing plate which can maintain stable optical properties at high temperature and high humidity.

When a polarizing plate is prepared employing the cellulose ester film in the invention, a polarizing plate having an increased viewing angle can be prepared in the same manner as in a conventional polarizing plate preparing method, except that the cellulose ester film in the invention is used instead of the conventional cellulose ester film used as the polarizing plate support, which is extremely advantageous for practical use. The cellulose ester film in the invention is extremely preferable support, since in the polarizing plate preparing process, the cellulose ester film saponified with an alkali can be adhered to a polarizer, and removal of moisture from the resulting adhered material is easily carried out. The polarizer is preferably one in which a polyvinyl alcohol film doped with a dichroic substance is stretched.

The present invention can provide a viewing angle increasing polarizing plate having a viewing angle increasing property employing the polarizing plate in the invention and a liquid crystal display employing the viewing angle increasing polarizing plate. Further, the present invention improves dependency of a vertical alignment (VA) type liquid crystal display on the viewing angle.

The polarizing plate of the invention has advantage in that the luminescent foreign materials described above are less as compared with a polarizing plate employing a cellulose ester film whose retardation in the thickness direction Rt is increased by increasing the thickness.

Next, the optical properties of the cellulose ester film in the invention will be explained.

In the invention, a cellulose ester film having optical biaxiality is used, and such optical biaxiality can be obtained by applying a tension in a specific direction in the conventional cellulose ester manufacturing method including the cellulose ester dope casting step. For example, it is especially effective that stretching of the cellulose ester film is carried out at the presence of a residual solvent after casting. Further, the cellulose ester film in the invention can be obtained by stretching a heated cellulose ester film.

The mixed fatty acid cellulose ester used for preparing the mixed fatty acid cellulose ester film in the invention is an ester of cellulose and two or more kinds of fatty acid. The fatty acid is preferably a lower fatty acid. The mixed fatty acid cellulose ester has a total acyl substitution degree of preferably more than 1.5, and more preferably from more than 1.5 to not more than 2.8.

The total acyl substitution degree hereinafter referred to is a sum of the number of acyl groups at 2, 3, or 6 position of the glucose unit of the cellulose ester molecule.

In the invention, a lower fatty acid cellulose ester having a specific substituent, that is, an acetyl group or a propionyl group is preferably used in obtaining an optical compensation property of more than a certain level.

The cellulose ester used in the preparation of the cellulose ester film in the invention is preferably one having an acyl group having a carbon atom number of from 2 to 4 as a substituent, and simultaneously satisfying the following formulae (3) and (4):

$$1.5 \leq A+B \leq 2.8 \qquad \text{formula (3)}$$

$$0.6 \leq B \leq 1.2 \qquad \text{formula (4)}$$

wherein A represents an acetyl substitution degree, and B represents a substitution degree of an acyl having a carbon atom number of 3 or 4.

In the invention, the cellulose ester is more preferably one simultaneously satisfying the following formulae (5) and (6):

$$2.1 \leq A+B \leq 2.8 \qquad \text{formula (5)}$$

$$0.6 \leq B \leq 1.2 \qquad \text{formula (6)}$$

In the cellulose ester, the hydrogen of the hydroxyl group of cellulose may be evenly substituted at 2-, 3, and 6-positions with the acyl group, or may be substituted at 6-position in a high substitution rate with the acyl group.

The acyl substitution degree can be determined according to ASTM-D817-96.

The cellulose ester film, in which the sum of an acetyl substitution degree and a substitution degree of an acyl having a carbon atom number of 3 or 4 falls within the range described above, has a phase difference greater to light having a longer wavelength, and can provide a good rate of water content and a water barrier property.

Particularly, the cellulose ester film having an acetyl substitution degree less than 2.0 is preferred in that phase difference variation at stretching is less.

The viscosity average polymerization degree (referred to also as polymerization degree) of the cellulose ester film in the invention is preferably from 200 to 700, and more preferably from 250 to 500, in that an optical compensation film with excellent mechanical strength is obtained.

The viscosity average polymerization degree described above is obtained according to the following method:

<<Measurement of Viscosity Average Polymerization Degree (DP)>>

Dry cellulose ester of 0.2 g is dissolved in 100 ml of a mixture solvent of methylene chloride and ethanol (methylene chloride:ethanol=9:1 by weight) to obtain a cellulose ester solution. The fall time of the resulting cellulose ester solution is measured at 25° C. according to an Ostwald's viscometer, and the polymerization degree is obtained from the following formulae.

$$\eta rel = T/Ts \quad (a)$$

$$[\eta] = (ln \eta rel)/C \quad (b)$$

$$DP = [\eta]/Km \quad (c)$$

wherein T is fall time of the cellulose ester solution, Ts is fall time of the solvent used, C is concentration (in terms of g/liter) of the cellulose ester in the solution, and Km is $6 \times 10^{-4}$.

<<Measurement of Retardations Rt and R0>>

The cellulose ester film in the invention preferably satisfies the following inequality (7), in order to obtain the effect of increasing viewing angle more efficiently.

$$\{(nx+ny)/2\} - nz > 0 \quad \text{Inequality (7)}$$

wherein nx represents refractive index in plane of the film in the direction x giving a maximum refractive index, nx represents refractive index in plane of the film in the direction y perpendicular to the direction x, and nz represents refractive index in the thickness direction of the film.

The cellulose ester film in the invention with optical biaxiality exhibits improved viewing angle. Viewing angle can be greatly improved by properly controlling a retardation Rt in the thickness direction of the film and a retardation R0 in plane of the film. As the control method of the retardation, there is, for example, a stretching method described later.

In the invention, the retardation Rt in the thickness direction of the film, defined by formula (2) described previously, is preferably from 60 to 300 nm, more preferably from 90 to 200 nm, and most preferably from 110 to 150 nm.

The retardation R0 in plane of the film is defined by formula (1) described previously. In the invention, the retardation R0 in plane of the film is preferably from 31 to 120 nm, more preferably from 31 to 60 nm, and most preferably from 31 to 60 nm.

The three dimensional refractive index of the cellulose ester film is measured at 23° C. and 55% RH employing light with at a wavelength of 590 nm by means of an automatic birefringence meter KOBRA-21ADH (produced by Oji Keisokukiki Co., Ltd.), to obtain refractive indices nx, ny and nz. The retardations Rt and R0 are obtained from the resulting indices nx, ny and nz.

The cellulose ester film in the invention with optical biaxiality is preferably a transparent support having a transmittance of not less than 80%, and preferably not less than 90%. The thickness of the cellulose ester film in the invention is preferably from 45 to 110 μm.

The mixed fatty acid cellulose ester used in the invention can be synthesized employing acid anhydrides and acid chlorides as the acylating agents. When the acylating agents are acid anhydrides, organic acids (for instance, acetic acid) as well as methylene chloride are employed as the reaction solvents, and acidic catalysts such as sulfuric acid are employed as catalysts. When the acylating agents are acid chlorides, basic compounds are employed as catalysts. In the most common synthesis method, cellulose is subjected to esterification employing organic acid components comprising organic acids comprising an acetyl group and a propionyl group (for example, acetic acid and propionic acid) or those acid anhydrides (for example, acetic anhydride and propionic anhydride), and thus cellulose esters are synthesized. The employed amount of the acetylating agents and propionylating agents is regulated so that the synthesized esters have the substitution degree range as described above. The employed amount of reaction solvents is preferably between 100 and 1,000 weight parts with respect to 100 weight parts of cellulose. The employed amount of acid catalysts is preferably between 0.1 and 20 weight parts, and more preferably between 0.4 and 10 weight parts, with respect to 100 weight parts of cellulose.

Reaction temperature is preferably between 10 and 120° C. Further, after completion of the acylation reaction, if desired, the substitution degree may be adjusted employing hydrolysis (saponification). After completion of the reaction, the resulting reaction mixture is separated employing common means such as precipitation, washed, and is subsequently dried. Thus fatty acid ester (cellulose acetate propionate) is obtained.

Employed individually or in combination as the fatty acid cellulose ester of the present invention are fatty acid ester synthesized employing cotton linters and fatty acid ester synthesized from wood pulp. Cellulose ester synthesized employing cotton linters is preferably employed at a larger ratio, because it is more readily peeled from a belt or drum, and thus enhances productivity. When the content of cellulose ester synthesized employing cotton linters is at least 60 percent, the peeling properties are markedly improved. Therefore, the content is preferably at least 60 percent, is more preferably at least 85 percent, and is most preferably 100 percent.

A cellulose ester in which cellulose is acetylated with an acetyl group and acylated with an acyl group having a carbon number of 3 or 4 is also called a mixed fatty acid ester of cellulose (a mixed fatty acid cellulose ester). Examples of the acyl group having a carbon number of 3 or 4 include a propionyl group and a butyryl group. A cellulose ester film with a propionyl group or an n-butyryl group is preferable, and a cellulose ester film with a propionyl group is more preferable, in view of mechanical strength of the cellulose ester film or ease of dissolution of the cellulose ester in a solvent.

Listed as solvents which dissolve the fatty acid cellulose ester of the present invention and form a dope may be methylene chloride, methyl acetate, ethyl acetate, amyl acetate, acetone, tetrahydrofuran, 1,3-dioxolan, 1,4-dioxolan, cyclohexanone, 2,2,2-trifluoroethanol, 2,2,3,3-tetrafluoro-1-propanol, 1,3-difluoro-2-propanol, and the like. Incidentally, chlorine based solvents such as methylene chloride may be employed without causing any problem from the technical aspect. It is preferred that amount of the chlorine based solvent is not more than 50% in the solvent.

Methyl acetate, ethyl acetate, acetone, and the like, cause the least environmental problem. Specifically, the content of methyl acetate is preferably at least 50 percent by weight with respect to the total organic solvents. Acetone is preferably employed in an amount of 5 to 30 percent by weight with respect to the total organic solvents, together with methyl acetate, because it makes it possible to decrease the dope viscosity.

In the present invention, containing of as little as possible chlorine based solvents means that the content of the chlorine based solvents is no more than 10 percent with respect to the total organic solvents, is more preferably no more then 5 percent, and is most preferably 0 percent.

In addition to the organic solvents described above, alcohols having from 1 to 30 carbon atoms are preferably incorporated into the fatty acid cellulose ester dope of the present invention in an amount of 1 to 30 percent. When alcohols are incorporated, after casting the dope onto a support, solvents start to evaporate and the web (a dope layer formed by casting a dope on a casting support is designated as the web) is gelled and the web is strengthened. Thus it is possible to more readily peel the web from the support. Further, it is possible to obtain effects which accelerate the dissolution of fatty acid cellulose ester. Listed as alcohols having from 1 to 4 carbon atoms are methanol, ethanol, n-propanol, iso-propanol, n-butanol, sec-butanol, and tert-butanol. Of these, ethanol is preferred, based on the stability of the resulting dope, its boiling point, drying properties, non-toxicity, and the like.

The solid portion concentration in a dope is commonly, and preferably, between 10 and 40 percent. From the viewpoint of obtaining excellent flatness of a film, the viscosity of a dope is preferably controlled to be in the range of 100 to 500 poise.

The dope, which has been prepared as described above, is filtered employing a filter media, defoamed, and subsequently conveyed to the next step, employing a pump.

Plasticizers, matting agents, UV absorbers, antioxidants, dyes, and the like may also be incorporated into said dope.

Fatty acid cellulose ester, having an acetyl group as well as a propionyl group employed in the present invention, exhibits effects of a plasticizer. As a result, sufficient film properties are obtained without the addition of plasticizer, or at most addition in small amounts. However, plasticizers may be added for other purposes. For example, for the purpose to enhance the moisture resistance of film, added may be alkyl phthalyl alkyl glycolates, phosphoric acid esters, carboxylic acid esters, and the like.

Listed as alkyl phthalyl alkyl glycolates are, for example, methyl phthalyl methyl glycolate, ethyl phthalyl ethyl glycolate, propyl phthalyl propyl glycolate, butyl phthalyl butyl glycolate, octyl phthalyl octyl glycolate, methyl phthalyl ethyl glycolate, ethyl phthalyl methyl glycolate, methyl phthalyl propyl glycolate, methyl phthalyl butyl glycolate, ethyl phthalyl butyl glycolate, butyl phthalyl methyl glycolate, butyl phthalyl ethyl glycolate, propyl phthalyl butyl glycolate, butyl phthalyl propyl glycolate, methyl phthalyl octyl glycolate, ethyl phthalyl octyl glycolate, octyl phthalyl methyl glycolate, octyl phthalyl ethyl glycolate, and the like.

Listed as phosphoric acid esters may be, for example, triphenyl phosphate, tricresyl phosphate, cresyl diphenyl phosphate, phenyl diphenyl phosphate, octyl diphenyl phosphate, trioctyl phosphate, tributyl phosphate, and the like.

Carboxylic acid esters include, for example, phthalic acid esters and citric acid esters. Listed as said phthalic acid esters may be dimethyl phthalate, diethyl phthalate, dimethoxyethyl phthalate, dimethyl phthalate, dioctyl phthalate, dibutyl phthalate, di-2-ethyl hexyl phthalate, and the like.

Listed as said citric acid esters may be, for example, acetyl trimethyl citrate, acetyl triethyl citrate, and acetyl tributyl acetate.

In addition, butyl oleate, methyl acetyl recinoleate, dibutyl sebacate, triacetin, and the like are preferably employed individually or in combination.

If desired, two or more types of plasticizers may be employed in combination. Phosphoric acid ester based plasticizers are preferred because when employed at a ratio of no more than 50 percent, the cellulose ester film is barely subjected to hydrolysis and exhibits excellent durability. Further, a low content of phosphoric acid based plasticizers is preferred. Particularly preferred is the sole use of phthalic acid ester based or glycolic acid ester based plasticizers. Of these, methyl phthalyl methyl glycolate, ethyl phthalyl ethyl glycolate, propyl phthalyl propyl glycolate, butyl phthalyl butyl glycolate, and octyl phthalyl octyl glycolate are preferred, and particularly employed is ethyl phthalyl ethyl glycolate. Alternatively, two or more types of these alkyl phthalyl alkyl glycolates are employed in combination. The amount of plasticizers employed for said purpose is preferably between 1 and 30 percent by weight, and is more preferably between 4 and 13 percent by weight with respect to the cellulose ester. These compounds may be added along with cellulose ester and solvents during preparation of a cellulose ester solution, or may be added during or after the preparation of the solution.

With the purpose to improve yellow hue of film, dyes are incorporated. Since cellulose ester film is tinted slightly yellow, dyes are preferred which are capable of tinting to gray as seen in common photographic supports. Thus blue and violet dyes are preferably employed. However, being different from the photographic supports, since it is unnecessary to minimize light piping, only a small amount of dye addition may be sufficient. Specifically the content of dyes is preferably between 1 and 100 ppm with respect to the cellulose ester, and is more preferably between 2 and 50 ppm. The cellulose ester is a little yellowish, and a blue or violet dye is preferably used. Gray may be obtained by appropriately combining a plurality of dyes.

When films are not sufficiently slippery, they are subjected to blocking with each other, and occasionally, ease of handling is degraded. Matting agents such as fine inorganic particles including silicon dioxide, titanium dioxide, sintered calcium silicate, hydrated calcium silicate, aluminum silicate, magnesium silicate, crosslinked polymers, and the like are preferably incorporated into the film, based on the present invention.

Further, in order to decrease the haze of a film, fine particles such as silicon dioxide are preferably subjected to surface treatment employing organic substances. Cited as preferred organic substances for said surface treatment are halosilanes, alkoxysilanes, silazanes, siloxanes, and the like. The matting effect increases as the average particle diameter of fine particles increases, while transparency increases as said diameter decreases. Accordingly, the average primary particles diameter of fine particles is no more than 0.1 µm, preferably between 5 and 50 nm, and more preferably between 7 and 14 nm. Listed as fine particles of silicon dioxide are Aerosil 200, 200V, 300, R972, R972V, R974, R202, R812, OX50, TT600 and the like, all of which are manufactured by Nihon Aerosil Co., ltd. of these, preferably listed are Aerosil R972, R972V, R974, R202, R812, and the like. Said matting agents are preferably blended to obtain a film haze of no more than 0.6 percent, and a friction coefficient of no more than 0.5. The amount of matting agents, which are employed for said purpose, is preferably between 0.005 and 0.3 percent by weight with respect to fatty acid cellulose ester.

Liquid crystal displays are increasingly employed in the open atmosphere. Thus it is important to provide a protective film for a polarizing plate with the function to absorb ultraviolet rays. UV absorbers are preferably incorporated into the cellulose ester film in the invention.

Preferred as UV absorbers are those which efficiently absorb ultraviolet rays having a wavelength of no longer than 370 nm from the viewpoint of minimizing the degradation of liquid crystals and which minimally absorb visible light having a wavelength of at least 400 nm from the viewpoint of producing an excellent liquid crystal display. Specifically, the transmittance at a wavelength of 370 nm is required to be not more than 10 percent, and preferably not more than 5 percent.

UV absorbers, which are employed to achieve said purposes, preferably have no absorption in the visible light range. Listed as such UV absorbers are benzotriazole based compounds, benzophenone based compounds, salicylic acid based compounds and the like.

Examples of such UV absorbers include 2-(2'-hydroxy-5-methylphenyl)benzotriazole, 2-(2'-hydroxy-3',5'-di-t-butylphenyl)benzotriazole, 2-(2'-hydroxy-3'-di-t-butyl-methylphenyl)benzotriazole, 2,4-dihydroxybenzophenone, 2-hydroxy-4-methoxybenzophenone, 2-hydroxy-4-n-octocybenzophenone, 4-dodecyloxy-2-hydrooxybenzophenone, 2,2',4,4'-tetrahydroxybenzophenone, 2,2'-dihydroxoy-4,4'-dimethoxybenzophenone, phenyl salicylate, methyl salicylate, and the like.

In the present invention, at least one of these UV absorbers is preferably employed, and at least two of different UV absorbers may be incorporated.

The addition methods of said UV absorbers are as follows. They may be dissolved in organic solvents such as alcohol, methylene chloride, dioxolan, and the like and the resulting solution is added to a dope. Alternatively, they may be added directly to a dope. UV absorbers such as inorganic powders, which are not soluble in organic solvents, may be dispersed into a mixture of organic solvents and cellulose ester, employing a dissolver or a sand mill, and added to a dope.

In the present invention, the employed amount of UV absorbers is commonly between 0.1 and 2.5 percent by weight with respect to the cellulose ester, is preferably between 0.5 and 2.0 percent by weight, and is more preferably between 0.8 and 2.0 percent by weight.

In order to enhance the heat resistance of the cellulose ester film, hindered phenol based compounds are preferably employed. The added amount of these compounds is preferably between 1 ppm and 1.0 percent by weight with respect to the cellulose ester, and is more preferably between 10 and 1,000 ppm. Further, in addition to these compounds, a heat stabilizer such as a salt of an alkali earth metal, for example, calcium or magnesium may also be added.

In addition to the aforementioned compounds, further, added may be antistatic agents, flame retarders, lubricants, and the like.

The cellulose ester film in the invention is provided between two polarizing plates, and foreign materials, which make extraordinary light emit, result in deterioration of performance. In view of the above, occurrence of so-called luminescent foreign materials is problem.

In the invention, when luminescent foreign materials are observed in the fatty acid cellulose ester film with optical biaxiality arranged in a crossed Nicol state, it is preferred that the number of luminescent foreign materials with a size of from 5 to 50 µm is not more than 150 per 250 mm$^2$ of the film, and the number of luminescent foreign materials with a size exceeding 50 µm is zero per 250 mm$^2$ of the film.

In the invention, luminescent foreign materials, which are observed in a crossed Nicol state, imply those which are observed as bright materials when a cellulose ester film is placed between two polarizing plates arranged at right angles (in crossed Nicol state) and then illuminated with a light source from one side. Such luminescent foreign materials are observed as bright materials in a dark visual field in crossed Nicol state, and therefore, it is possible to readily determine the size as well as the number of luminescent foreign materials. The cellulose ester film in the invention can decrease its thickness compared with a phase difference plate with a high Rt, and can reduce the number of foreign materials observed as bright materials.

Regarding luminescent foreign materials observed in a crossed Nicol state, the number of luminescent foreign materials with a size of from 5 to 50 µm is not more than 150, preferably not more than 50, and more preferably from 0 to 10, per 250 mm$^2$ of the film, and the number of luminescent foreign materials with a size exceeding 50 µm is zero per 250 mm$^2$ of the film. Many luminescent foreign materials have an adverse effect on image quality of a liquid crystal display.

Next, a manufacturing method of the cellulose ester film in the invention will be explained. The cellulose ester film manufacturing method is preferably a solution cast film manufacturing method comprising the steps of casting a cellulose ester dope onto a support to form a web, peeling the web from the support, applying a tension to the peeled web, and drying it while transporting on a drying zone. The solution cast film manufacturing method will be explained below.

(1) Dissolution Step

The dissolution step is one in which cellulose ester flakes are dissolved, while stirring, in organic solvents mainly comprised of good solvents for said flakes, employing a dissolution vessel, and thereby a cellulose ester solution (hereinafter referred to as a dope) is prepared. In order to carry out said dissolution, there are various methods such as a method in which dissolution is carried out at a normal atmospheric pressure, a method in which dissolution is carried out at a temperature lower than the boiling point of the primary solvent, a method in which dissolution is carried out at a temperature higher than the boiling point of the main solvent under an increase of pressure, a cooling dissolution method in which dissolution is carried out at a lowering temperature, as described in J. M. G. Cowie et al., Makromol hem., volume 143, page 105 (1971), and Japanese Patent Publication Open to Public Inspection Nos. 9-95544 and 9-95557, and others, a method in which dissolution is carried out at a high pressure, and the like. The resultant dope is filtered employing filter materials, is then defoamed, and is subsequently pumped to the next step.

(2) Casting Step

The casting step is one in which a dope is conveyed to a pressure die through a pressure type metering gear pump, and cast from said pressure die on a support (hereinafter referred to also as a support) for casting such as a moving endless metal belt or a rotating metal drum at a casting position. The surface of the support for casting is specular.

As other casting steps, there is a doctor blade method adjusting the dope thickness of the cast dope with a doctor blade or a reverse roller method adjusting the dope thickness of the cast dope with a reverse roller coater rotating reversely. A pressure die is preferred in which the slit shape at the mouth piece portion can be regulated and the film thickness is readily regulated to be uniform. Examples of the pressure die include a coat hanger die, a "T" die, and the like, and any of these is preferably employed. In order to increase the casting speed, two or more pressure dies may be provided on the metal support and dopes divided into two or more may be simultaneously cast on the metal support. A laminated cellulose ester film can be also prepared by a co-casting method.

(3) Solvent Evaporation Step

The solvent evaporation step is one in which a web (a film formed after a dope is cast on a support for casting is called a web) is heated on a support for casting and solvents are evaporated. In order to evaporate solvents, methods include a method in which air is blown from the web side, and/or a method in which heating is carried out from the reverse surface of the support employing liquid, and a method in which heating is carried out from the surface as well as the revere surface employing heat radiation. Of these, the reverse surface liquid heating method is preferred due to high drying efficiency. Further, these methods are preferably combined.

(4) Peeling Step

The peeling step is one in which a web, which has been subjected to evaporation of solvents on the support, is peeled at the peeling position. The peeled web is conveyed to the subsequent step. When the residual solvent amount (represented by the formula described below) is too large, it may be difficult to peel the web. On the contrary, when peeling is carried out after fully drying the web on the support, a part of the web may peel prior to the peeling position.

Listed as a method to increase the film forming speed is a gel casting method (in which peeling can be carried out even though the amount of residual solvents is relatively great). The gel casting methods include a method in which poor solvents with respect to the cellulose ester are added to a dope and gelling is carried out after casting said dope, and also a method in which gelling is carried out by decreasing the temperature of a support, and the like. There is further a method in which metal salts are added to the cellulose ester dope. By strengthening the web through gelling the dope on the support, it is possible to carry out earlier peeling and to increase the casting speed. When the peeling is carried out at the time when the residual solvent amount is still relatively great, the web may be too soft, in which during peeling, the flatness of the web tends to be degraded, and wrinkles and longitudinal streaks due to the peeling tension tend to be formed. Accordingly, the residual solvent amount at the peeling is determined so that productivity and quality are balanced.

(3) Drying Step

The drying step is a step, which dries the web employing a drying apparatus in which said web is alternatively transported through staggered rollers and/or a tenter apparatus in which said web is transported while holding both edges of the web employing clips. An ordinal common drying method is one in which both surfaces of the web are heated by heated air flow. Instead of the air flow, employed is a method in which heating is carried out employing microwaves. Too rapid drying tends to degrade the flatness of the finished film. A high temperature drying is preferably applied to the web having a residual solvent content of not more than 8% by weight. During the entire drying step, drying temperature is ordinarily from 40 to 250° C., and preferably 70 to 180° C. Drying temperature, drying time, and air volume for drying vary depending on employed solvents. Thus, drying conditions may be properly selected depending on types of employed solvents and their combination.

In the drying step after peeling the web from the support, the web tends to shrink in the transverse direction due to evaporation of the organic solvent. When the web is dried rapidly at a higher temperature, the tendency of the web shrinkage is stronger. Drying of the web while the shrinkage is minimized as far as possible is preferable in improving a flatness of the finished cellulose ester film. In view of the above, a method disclosed in Japanese Patent O.P.I. Publication No. 62-46625 is preferably used which comprises drying the web while holding the both edges in the transverse direction of the web by clips or pins to maintain the web width (a tenter method).

(6) Winding Step

This step is one in which after the residual solvent content of the web is not more than 2% by weight, the resulting cellulose ester film is wound around a spool. The cellulose ester film having a residual solvent content of not more than 0.4% by weight provides good dimensional stability. Any of conventional winding methods can be used, and examples of the winding methods include a constant torque method, a constant tension method, a taper tension method, and a method programmed so as to have a constant inside stress.

The thickness of the fatty acid cellulose ester film can be adjusted by controlling a dope concentration, a dope amount supplied by a pump, a slit width of the mouth piece portion of a die, an extrusion pressure of a die, or a moving speed of a support for casting. It is preferred that the thickness of the cellulose ester film is uniformly regulated by feeding back a thickness information detected by a thickness detector to the devices described above through a system programmed in advance for information to be fed back to them.

In the step from the casting to the drying in the solution cast film manufacture process, drying of the web in the drying apparatus may be carried out at an air atmosphere or at an atmosphere of an inert gas such as a nitrogen gas, a carbon dioxide gas or an argon gas. It is not needless to say that the explosion limits of the vaporized organic solvents in the drying apparatus should be always considered.

The cellulose ester film in the invention having optical biaxiality can be prepared according to any method for obtaining an orientation showing optical biaxiality (showing the relation nx>ny>Nz), but one of the methods, which are effective, is a stretching method.

In the preparation of the cellulose ester film in the invention, stretching can be carried out at not so high temperature controlling the residual solvent in the film as described later, but can be also carried out at high temperature when the residual solvent is not controlled. When stretching of the cellulose ester film is carried out at high temperature, the stretching temperature is not less than the glass transition point of the cellulose ester, some of the plasticizers described above reduce the effect in stretching, and does not provide a sufficient stretching property. Therefore, a plasticizer capable of providing a sufficient stretching property at high temperature is necessary, and it has been found that a plasticizer having non-volatility can be used as such a plasticizer. The plasticizer having non-volatility herein referred to is a compound with a vapor pressure at 200° C. of not more than 1330 Pa, which has an extremely low vapor pressure and an extremely low volatility. The vapor pressure at 200° C. is preferably not more than 665 Pa, and more preferably not more than 133 Pa. For example, arylene bis(diarylphosphate) ester is preferred. Besides, tricresyl phosphate (vapor pressure: 38.6 Pa, 200° C.), or tris(2-ethylhexyl) trimellitate (vapor pressure: 66.5 Pa, 200° C.) are preferably used. Further, non-volatile phosphates, disclosed I Japanese Patent Publication No. 501040, are preferably used. High molecular weight plasticizers such as oligomers and polymers including acryl resin and polyvinyl acetate are preferably used. The plasticizer content of the cellulose ester film is preferably 0.1 to 30% by weight, and more preferably 0.5 to 14% by weight, based on the cellulose ester. Employing the plasticizer, the stretching property at high temperature of cellulose ester film can be improved, and cellulose ester film with excellent surface quality or excellent flatness can be efficiently manufactured.

As one of the preferred methods for giving optical biaxiality to the cellulose ester film in the invention, there is a method in which a cellulose ester web containing a residual solvent is stretched. Such a stretching method will be explained below.

In the manufacture process of the cellulose ester film in the invention, the cellulose ester dope is cast on a support for casting to form a web (web film), and the web is peeled from the support. The peeled web is preferably stretched in at least one direction by a factor of from 1.0 to 4.0, while the residual solvent content of the web is not more than 100% by weight, and preferably 10 to 100% by weight.

The residual solvent content of the web is represented by the following formula:

Residual solvent content (% by weight)=$\{(M-N)/N\}\times 100$ wherein M represents weight of the web to be measured, and N represents weight after the web has been dried at 110° C. for three hours.

When the residual solvent content of the web is too high, the effects due to stretching of the web cannot be obtained. When the residual solvent content is too low, it is difficult to stretch the web, which may result in web rupture. The residual solvent content of the web is more preferably from 10 to 500% by weight, and still more preferably 15 to 40% by weight.

When the stretching magnification is too low, sufficient phase difference cannot be obtained, while when the stretching magnification is too high, it is difficult to stretch the web, which may result in web rupture. The stretching magnification is more preferably from 1.0 to 3.5.

A web formed after casting the dope of the cellulose ester in the invention, when the web has a specific residual solvent content, can be stretched without being heated to high temperature. It is preferred that stretching and drying are simultaneously carried out, since the steps of the film manufacture are reduced. When the web temperature is too high, plasticizer contained in the web is volatilized. Therefore, the web temperature is preferably from room temperature (15° C.) to 180° C.

Stretching the web in two axis directions perpendicular to each other is an efficient method to adjust refractive indices nx, ny, and nz of the film to the range defined in the invention.

Variation in thickness of the film can be reduced by stretching the web in two axis directions perpendicular to each other. The cellulose ester film with great variation in the thickness causes unevenness of phase difference, and when such a film is used in an optical compensation film, there occurs a problem such as coloring. Variation in thickness of the cellulose ester film is within the range of preferably ±3%, and more preferably ±1%. In view of the above, stretching the web in two axis directions perpendicular to each other is effective, and it is preferred that the stretching magnification in one axis direction and the stretching magnification in the other direction are from 0.8 to 4.0 and 0.4 to 1.2, respectively.

A method of stretching the web is not specifically limited. There are, for example, a method of stretching the web in the mechanical direction employing plural transporting rollers having different peripheral speeds, a method of fixing both ends of the web with clips or pins and stretching the web in the mechanical direction broadening the intervals of the clips or pins in the transporting direction, and a method of stretching the web in the mechanical and transverse directions simultaneously broadening the intervals of the clips or pins in the transporting and transverse directions. These methods may be used in combination. When so-called a tenter is used, and the clips are driven according to a linear drive method, a smooth stretching can be realized, reducing danger such as web rupture.

It is preferred in view of dimensional stability that the finally finished cellulose ester film has a residual solvent content of not more than 2% by weight, and preferably not more than 0.4% by weight.

It is preferred in the invention that the various conditions described above are controlled at the cast film manufacture to give a maximum refractive index in the transverse direction of the cellulose ester film.

As described above, the cellulose ester film with optical biaxiality in the invention satisfies inequality nx>ny>nz. In the invention, "a maximum refractive index in the transverse direction" described above implies that the direction giving nx is approximately in accordance with the transverse direction.

Herein, that one of the two directions is approximately in accordance with the other implies that one of the two axis directions is approximately in parallel with the other. Further, that one of the two axis directions is approximately in parallel with the other implies that the angle formed between the two axis directions is within the range of ±10°, preferably ±3°, and more preferably ±1°.

In the polarizing plate of the invention, the cellulose ester film with optical biaxiality is preferably laminated onto a polarizing film containing a dichroic substance, so that the transmission axis of the polarizing film is approximately in parallel with the stretching direction in the transverse direction of the film at the film manufacture process.

In preparation of the polarizing plate of the invention, a cellulose ester film with optical biaxiality is laminated onto a polarizing film containing a dichroic substance. As the cellulose ester film, a long length cellulose ester roll film is preferably used in view of production efficiency. In the invention, the long length cellulose ester roll film has a length of not less than 500 m, preferably not less than 1000 m, and still more preferably from 1000 to 4000 m.

The polarizing plate of the invention and the liquid crystal display of the invention employing the polarizing plate will be explained below.

A conventional polarizing film can be used as the polarizing film used in the polarizing plate of the invention. For example, a polarizing film, in which a film of a hydrophilic polymer such as polyvinyl alcohol is treated with a dichromatic dye such as iodine, and stretched, or a polarizing film, in which a plastic film such as polyvinyl chloride is subjected to orientation treatment, can be used. The thus obtained polarizing film is laminated with a cellulose ester film.

In the invention, it is essential that the cellulose ester film in the invention be provided on at least one side of the polarizing film of the polarizing plate. Although cellulose triacetate (TAC) film used in the support of a conventional polarizing plate may be provided on the other side of the polarizing film of the polarizing plate, all the cellulose ester films used in the polarizing plate are preferably the cellulose ester film in the invention in view of similarity in physical properties of both surfaces of the polarizing plate, whereby the effect of the invention is obtained most efficiently.

A polarizing plate, which comprises the cellulose ester film in the invention, and provided thereon, a polarizing film and a second cellulose acetate film having been stretched in the transverse direction in that order, provides a polarizing plate with phase difference function which provides reduced dimensional change (shape change) under various temperature and humidity circumstances, and maintains excellent optical properties. The stretching in the transverse direction may be carried out during or after the film manufacture, however, it is preferred in view of productivity or uniformity of stretching that the stretching is continuously carried out during the film manufacture. The stretching magnification is preferably from 1.01 to 1.2, more preferably from 1.03 to 1.15, and most preferably from 1.05 to 1.10. The second cellulose acetate film is preferably cellulose triacetate (TAC) film.

In the above polarizing plate, the ratio A/B of stretching magnification A of the cellulose ester film in the invention provided on one side of the polarizing film to stretching magnification B of the cellulose triacetate film provided on the other side of the polarizing film is preferably from 1000 to 0.001, more preferably from 200 to 0.005, and still more preferably from 100 to 0.01.

The polarizing plate is preferably a polarizing plate in which the casting direction during manufacture of the cellulose ester film in the invention is approximately parallel with the stretching direction of the polarizing film. The thus obtained polarizing plate is provided on both sides of a liquid crystal cell, and preferably has the following constitution.

The polarizing plate of the invention has the constitution shown in, for example, FIG. 1. In FIG. 1, a liquid crystal display 9 is comprised of a crystal cell 7 and two polarizing plates 6a and 6b.

The polarizing plate 6a is comprised of two cellulose ester films 1a and one polarizing film 2a, and the polarizing plate 6b is comprised of two cellulose ester films 1b and one polarizing film 2b.

In polarizing plate 6a, an arrow 3a represents the casting direction during manufacture of the cellulose ester film 1a, and in polarizing plate 6b, an arrow 3b represents the casting direction during manufacture of the cellulose ester film 1b. An arrow 4a represents the stretching direction of the polarizing film 2a, and an arrow 4b represents the stretching direction of the polarizing film 2b. A VA mode liquid crystal display with the simple constitution described above can be obtained in which visibility in the oblique direction is greatly improved.

EXAMPLES

The invention will be detailed according to the following examples, but is not limited thereto.

Example 1

<<Preparation of Cellulose Ester Film>>

(Preparation of Cellulose Ester Film 1)

Cellulose acetate propionate (with an acetyl substitution degree of 2.00 and a propionyl substitution degree of 0.80 and a viscosity average polymerization degree of 350) of 100 parts by weight, 5 parts by weight of ethylphthalylethyl glycolate, 3 parts by weight of triphenyl phosphate, 290 parts by weight of methylene chloride, and 60 parts by weight of ethanol were placed into a tightly sealed vessel, and gradually heated to 45° C. in 60 minutes while slowly stirred. Pressure in the vessel was 121 kPa. The resulting solution was filtered employing Azumi filter paper No. 244, produced by Azumi Roshi Co., Ltd., and allowed to stand for 24 hours to remove foams in the solution. Thus, a cellulose ester solution was prepared.

Five parts by weight of the cellulose acetate propionate described above, 6 parts by weight of TINUVIN 326 (produced by Ciba Specialty Co., Ltd.), 4 parts by weight of TINUVIN 109 (produced by Ciba Specialty Co., Ltd.), and 5 parts by weight of TINUVIN 171 (produced by Ciba Specialty Co., Ltd.) were dissolved in a solvent of 94 parts by weight of methylene chloride and 8 parts by weight of ethanol. Thus, a UV absorber solution was obtained.

One hundred parts by weight of the cellulose ester solution were mixed with 2 parts by weight of the UV absorber solution and the mixture was stirred with a static mixer to prepare a dope. The dope of 30° C. was cast at a width of 1.6 m on a stainless steel belt support from a die coater, dried for 1 minute on the stainless steel whose the rear side was brought into contact with 25° C. water, and maintained for 15 seconds on the stainless steel cooled whose rear side was further brought into contact with a 15° C. chilled water to form a web. Then, the web was peeled from the support. The residual solvent content at the peeling of the web was 100% by weight. Subsequently, employing a tenter for stretching, both edges of the peeled web were held with clips and the distance between the clips was changed by applying a tension only in the transverse direction of the web at 120° C., so that the web was stretched in the transverse direction at a stretching magnification of 1.65. The stretched web was dried at 120° C. for 10 minutes while transported on the rollers to prepare cellulose ester film 1 with a thickness of 110 μm.

The resulting cellulose ester film 1 was wound around a core of a glass fiber reinforced resin with a diameter of 200 mm according to a taper tension method to form a film roll having a width of 1 m and a length of 1000 m. In this step, a 250° C. embossing ring was applied to the edges of the film for embossing treatment in order to prevent film adherence in the roll film. Thus, roll film was obtained.

Three cellulose ester film samples were taken from the central portion in the transverse direction of the resulting roll film, and refractive index nx in the delayed phase axis direction, refractive index ny in the advanced phase axis direction, and refractive index nz in the thickness direction were measured. Retardation in plane R0 and retardation in the thickness direction Rt of the samples were calculated from the measurements employing formulae (1) and (2) described above. In the central portion, R0 was 88 nm, and Rt was 205 nm. The direction of the delayed phase axis of the samples was within ±0.7° with respect to the transverse direction of the film.

Measurement of the three dimensional birefringence of the cellulose ester film was made at 23° C. and 55% RH employing light with at a wavelength of 590 nm by means of an automatic birefringence meter KOBRA-21ADH (produced by Oji Keisokukiki Co., Ltd.), and then, refractive indices nx, ny and nx were determined. Further, the rate of water content of the sample was determined employing a measuring method of rate of water content described later. The rate of water content of the sample was 1.8%.

(Preparation of Cellulose Ester Film 2)

Cellulose acetate propionate (with an acetyl substitution degree of 1.90 and a propionyl substitution degree of 0.75 and a viscosity average polymerization degree of 350) of 100 parts by weight, 2 parts by weight of ethylphthalylethyl glycolate, 8.5 parts by weight of triphenyl phosphate, 290 parts by weight of methylene chloride, and 60 parts by weight of ethanol were placed into a tightly sealed vessel, and gradually heated to 45° C. in 60 minutes while slowly stirred. Pressure in the vessel was 121 kPa. The resulting solution was filtered employing Azumi filter paper No. 244, produced by Azumi Roshi Co., Ltd., and allowed to stand for 24 hours to remove foams in the solution. Thus, a cellulose ester solution was prepared.

Five parts by weight of the cellulose acetate propionate described above, 6 parts by weight of TINUVIN 326 (produced by Ciba Specialty Co., Ltd.), 4 parts by weight of TINUVIN 109 (produced by Ciba Specialty Co., Ltd.), and 5 parts by weight of TINUVIN 171 (produced by Ciba Specialty Co., Ltd.) were dissolved in a solvent of 94 parts by weight of methylene chloride and 8 parts by weight of ethanol. Thus, a UV absorber solution was obtained.

One hundred parts by weight of the cellulose ester solution were mixed with 2 parts by weight of the UV absorber solution and the mixture was stirred with a static mixer to prepare a dope. The dope of 30° C. was cast at a width of 1.6 m on a stainless steel belt support from a die coater, dried for 1 minute on the stainless steel whose the rear side was brought into contact with 25° C. water, and maintained for 15 seconds on the stainless steel cooled whose rear side was further brought into contact with a 15° C. chilled water to form a web. Then, the web was peeled from the support. The residual solvent content at the peeling of the web was 90% by weight. Subsequently, employing a tenter for stretching, both edges of the peeled web were held with clips and the distance between the clips was changed by applying a tension only in the transverse direction of the web at 120° C., so that the web was stretched in the transverse direction at a stretching magnification of 1.40. The stretched web was dried at 125° C. for 10 minutes while transported on the rollers to prepare cellulose ester film 2 with a thickness of 70 µm.

The resulting cellulose ester film 2 was wound around a core of a glass fiber reinforced resin with a diameter of 200 mm according to a taper tension method to form a film roll having a width of 1 m and a length of 1000 m. In this step, a 250° C. embossing ring was applied to the edges of the film for embossing treatment in order to prevent film adherence in the roll film. Thus, roll film was obtained.

A cellulose ester film sample was taken from the central portion in the transverse direction of the resulting roll film. Refractive indices nx, ny, and nz of the sample were measured in the same manner as above, and retardation in plane R0 and retardation in the thickness direction Rt of the sample were calculated. In the central portion of the sample, R0 was 47 nm, and Rt was 132 nm. Further, the rate of water content of the sample was 1.8%.

(Preparation of Cellulose Ester Film 3)

Cellulose acetate propionate (with an acetyl substitution degree of 1.60 and a propionyl substitution degree of 1.20 and a viscosity average polymerization degree of 400) of 100 parts by weight, 5 parts by weight of ethylphthalylethyl glycolate, 3 parts by weight of triphenyl phosphate, 290 parts by weight of methylene chloride, and 60 parts by weight of ethanol were placed into a tightly sealed vessel, and gradually heated to 45° C. in 60 minutes while slowly stirred. Pressure in the vessel was 121 kPa. The resulting solution was filtered employing Azumi filter paper No. 244, produced by Azumi Roshi Co., Ltd., and allowed to stand for 24 hours to remove foams in the solution. Thus, a cellulose ester solution was prepared. Five parts by weight of the cellulose acetate propionate described above, 6 parts by weight of TINUVIN 326 (produced by Ciba Specialty Co., Ltd.), 4 parts by weight of TINUVIN 109 (produced by Ciba Specialty Co., Ltd.), 5 parts by weight of TINUVIN 171 (produced by Ciba Specialty Co., Ltd.) and 1 part by weight of AEROSIL R972V (produced by NIPPON AEROSIL Co., Ltd.) were dissolved in a solvent of 94 parts by weight of methylene chloride and 8 parts by weight of ethanol. Thus, a UV absorber solution was obtained. R972V was added as a dispersion in which R972V had been dispersed in the above ethanol.

One hundred parts by weight of the cellulose ester solution were mixed with 2 parts by weight of the UV absorber solution and the mixture was stirred with a static mixer to prepare a dope. The dope of 30° C. was cast at a width of 1.6 m on a stainless steel belt support from a die coater, dried for 1 minute on the stainless steel whose the rear side was brought into contact with 25° C. water, and maintained for 15 seconds on the stainless steel cooled whose rear side was further brought into contact with a 15° C. chilled water to form a web. Then, the web was peeled from the support. The residual solvent content at the peeling of the web was 90% by weight. Subsequently, employing a tenter for stretching, both edges of the peeled web were held with clips and the distance between the clips was changed by applying a tension only in the transverse direction of the web at 100° C., so that the web was stretched in the transverse direction at a stretching magnification of 1.5. The stretched web was dried at 120° C. for 10 minutes while transported on the rollers to prepare cellulose ester film 3 with a thickness of 90 µm.

The resulting cellulose ester film 3 was wound around a core of a glass fiber reinforced resin with a diameter of 200 mm according to a taper tension method to form a film roll having a width of 1 m and a length of 1000 m. In this step, a 250° C. embossing ring was applied to the edges of the film for embossing treatment in order to prevent film adherence in the roll film. Thus, roll film was obtained.

Three cellulose ester film samples were taken from the central portion in the transverse direction of the resulting roll film. Refractive indices nx, ny, and nz of the samples were measured in the same manner as above, and retardation in plane R0 and retardation in the thickness direction Rt of the sample were calculated. In the central portion of the samples, R0 was 85 nm, and Rt was 210 nm. The direction of the delayed phase axis of the samples was within ±0.4° with respect to the transverse direction of the film. Further, the rate of water content of the samples was 2.1%.

(Preparation of Cellulose Ester Film 4)

Cellulose acetate propionate (with an acetyl substitution degree of 2.00 and a propionyl substitution degree of 0.80 and a viscosity average polymerization degree of 350) of 100 parts by weight, 5 parts by weight of ethylphthalylethyl glycolate, 3 parts by weight of triphenyl phosphate, 175 parts by weight of methyl acetate, and 75 parts by weight of ethanol were placed into a tightly sealed vessel, and gradually heated to 65° C. in 60 minutes while slowly stirred. Pressure in the vessel was 121 kPa. The resulting solution was filtered employing Azumi filter paper No. 244, produced by Azumi Roshi Co., Ltd., and allowed to stand for 24 hours to remove foams in the solution. Thus, a cellulose ester solution was prepared. Five parts by weight of the cellulose acetate propionate described above, 6 parts by weight of TINUVIN 326 (produced by Ciba Specialty Co., Ltd.), 4 parts by weight of TINUVIN 109 (produced by Ciba Specialty Co., Ltd.), and 5 parts by weight of TINUVIN 171 (produced by Ciba Specialty Co., Ltd.) were dissolved in a solvent of 94 parts by weight of methyl acetate and 8 parts by weight of ethanol. Thus, a UV absorber solution was obtained. One hundred parts by weight of the cellulose ester solution were mixed with 2 parts by weight of the UV absorber solution and the mixture was stirred with a static mixer to prepare a dope. The dope of 50° C. was cast at a width of 1.6 m on a stainless steel belt support from a die coater, dried for 1 minute on the stainless steel whose the rear side was brought into contact with 55° C. water, and maintained for 15 seconds on the stainless steel cooled whose rear side was further brought into contact with a 15° C. chilled water to form a web. Then, the web was peeled from the support. The residual solvent content at the peeling of the web was 80% by weight. Subsequently, employing a tenter for stretching, both edges of the peeled web were held with clips in a tenter for simultaneous biaxial stretching and the web was stretched at 120° C. by simultaneously applying a tension both in the transverse direction and in the mechanical direction, so that the web was stretched in the transverse direction at a stretching magnification of 1.55, and stretched in the mechanical direction at a stretching magnification of 1.05. The stretched web was dried at 130° C. for 10 minutes while transported on the rollers to prepare cellulose ester film 4 with a thickness of 120 µm.

The resulting cellulose ester film 3 was wound around a core of a glass fiber reinforced resin with a diameter of 200 mm according to a taper tension method to form a film roll having a width of 1 m and a length of 1000 m. In this step, a 250° C. embossing ring was applied to the edges of the film for embossing treatment in order to prevent film adherence in the roll film. Thus, roll film was obtained.

Three cellulose ester film samples were taken from the central portion in the transverse direction of the resulting roll film. Refractive indices nx, ny, and nz of the samples were measured in the same manner as above, and retardation in plane R0 and retardation in the thickness direction Rt of the sample were calculated. In the central portion of the samples, R0 was 93 nm, and Rt was 227 nm. The direction of the delayed phase axis of the samples was within ±0.9° with respect to the transverse direction of the film. Further, the rate of water content of the samples was 1.6%.

(Preparation of Cellulose Ester Film 5) Cellulose ester film 5 with a thickness of 75 µm and its roll film were prepared in the same manner as in cellulose ester film 1, except that cellulose acetate butyrate (with an acetyl substitution degree of 1.90 and a butyryl substitution degree of 0.75 and a viscosity average polymerization degree of 300) was used instead of cellulose acetate butyrate.

Three cellulose ester film samples were taken from the central portion in the transverse direction of the resulting roll film. Refractive indices nx, ny, and nz of the samples were measured in the same manner as above, and retardation in plane R0 and retardation in the thickness direction Rt of the sample were calculated. In the central portion of the samples, R0 was 44 nm, and Rt was 136 nm. The direction of the delayed phase axis of the samples was within ±1.0° with respect to the transverse direction of the film. Further, the rate of water content of the samples was 1.3%.

(Preparation of Cellulose Ester Film 6)

Cellulose ester film 6 with a thickness of 75 µm and its roll film were prepared in the same manner as in cellulose ester film 1, except that the stretching magnification was 1.55 and the film thickness was 48 µm.

Three cellulose ester film sample were taken from the central portion in the transverse direction of the resulting roll film. Refractive indices nx, ny, and nz of the samples were measured in the same manner as above, and retardation in plane R0 and retardation in the thickness direction Rt of the sample were calculated. In the central portion of the samples, R0 was 43 nm, and Rt was 126 nm. The direction of the delayed phase axis of the samples was within ±0.7° with respect to the transverse direction of the film. Further, the rate of water content of the samples was 1.1%.

(Preparation of Cellulose Ester Film 7)

Cellulose acetate propionate (with an acetyl substitution degree of 2.30 and a propionyl substitution degree of 0.5 and a viscosity average polymerization degree of 300) of 100 parts by weight, 5 parts by weight of ethylphthalylethyl glycolate, 3 parts by weight of triphenyl phosphate, 290 parts by weight of methylene chloride, and 60 parts by weight of ethanol were placed into a tightly sealed vessel, and gradually heated to 45° C. in 60 minutes while slowly stirred. Pressure in the vessel was 121 kPa. The resulting solution was filtered employing Azumi filter paper No. 244, produced by Azumi Roshi Co., Ltd., and allowed to stand for 24 hours to remove foams in the solution. Thus, a cellulose ester solution was prepared.

Three parts by weight of the cellulose acetate propionate described above, 3 parts by weight of TINUVIN 326 (produced by Ciba Specialty Co., Ltd.), 4 parts by weight of TINUVIN 109 (produced by Ciba Specialty Co., Ltd.), and 5 parts by weight of TINUVIN 171 (produced by Ciba Specialty Co., Ltd.) were dissolved in a solvent of 90 parts by weight of methylene chloride and 10 parts by weight of ethanol. Thus, a UV absorber solution was obtained.

One hundred parts by weight of the cellulose ester solution were mixed with 2 parts by weight of the UV absorber solution and the mixture was stirred with a static mixer to prepare a dope. The dope of 30° C. was cast on a stainless steel belt support from a die coater, dried for 1 minute on the stainless steel whose the rear side was brought into contact with 35° C. water, and maintained for 15 seconds on the stainless steel cooled whose rear side was further brought into contact with a 15° C. chilled water to form a web. Then, the web was peeled from the support. The residual solvent content at the peeling of the web was 70% by weight.

Subsequently, the peeled web was transported through the rollers in a 120° C. oven, where the peripheral speed of the rollers at the outlet of the oven was 1.7 times the peripheral speed of the rollers at the inlet of the oven so that the web was stretched in the mechanical direction at a stretching magnification of 1.7. Immediately after that, the web was cooled to 60° C. Then, the resulting web was dried at 130° C. for 5 minutes in a tenter while both edges of the web were held with clips, the distance between the clips being fixed, to prepare cellulose ester film 7 with a thickness of 115 µm.

The resulting cellulose ester film 7 was wound around a core of a glass fiber reinforced resin with a diameter of 200 mm according to a taper tension method to form a film roll having a width of 1 m and a length of 1000 m. In this step, a 270° C. embossing ring was pressed onto the edges of the film for embossing treatment to give a height of 10 µm in order to prevent film adherence in the roll film. Thus, roll film was obtained.

Three cellulose ester film samples were taken from the central portion in the transverse direction of the resulting roll film. Refractive indices nx, ny, and nz of the samples were measured in the same manner as above, and retardation in plane R0 and retardation in the thickness direction Rt of the sample were calculated. In the central portion of the samples, R0 was 102 nm, and Rt was 163 nm. The direction of the delayed phase axis of the samples were within ±0.5° with respect to the transverse direction of the film. Further, the rate of water content of the samples was 2.0%.

<<Preparation of Comparative Film 1 (TAC Film 1)>>

A conventional cellulose triacetate film (TAC film 1), which has been used as a substrate for a polarizing plate, was prepared according to the following procedures.

Cellulose triacetate (with an acetyl substitution degree of 2.92 and a viscosity average polymerization degree of 300) of 100 parts by weight, 2 parts by weight of ethylphthalylethyl glycolate, 10 parts by weight of triphenyl phosphate, 350 parts by weight of methylene chloride, and 50 parts by weight of ethanol were placed into a tightly sealed vessel, and gradually heated to 45° C. in 60 minutes while slowly stirred. Pressure in the vessel was 121 kPa. The resulting solution was filtered employing Azumi filter paper No. 244, produced by Azumi Roshi Co., Ltd., and allowed to stand for 24 hours to remove foams in the solution. Thus, a cellulose triacetate solution was prepared.

Five parts by weight of the cellulose triacetate described above, 3 parts by weight of TINUVIN 326 (produced by Ciba Specialty Co., Ltd.), 7 parts by weight of TINUVIN 109 (produced by Ciba Specialty Co., Ltd.), 5 parts by weight of TINUVIN 171 (produced by Ciba Specialty Co., Ltd.) and 1 part by weight of AEROSIL 200V (produced by NIPPON AEROSIL Co., Ltd.) were dissolved in a solvent of 90 parts by weight of methylene chloride and 10 parts by weight of ethanol. Thus, a UW absorber solution was obtained. One hundred parts by weight of the cellulose triacetate solution were mixed with 2 parts by weight of the UV absorber solution and the mixture was stirred with a static mixer to prepare a dope. The dope of 30° C. was cast on a stainless steel belt support from a die coater, dried for 1 minute on the stainless steel whose the rear side was brought into contact with 30° C. water, and maintained for 15 seconds on the stainless steel cooled whose rear side was further brought into contact with a 15° C. chilled water to form a web. Then, the web was peeled from the support.

The residual solvent content at the peeling of the web was 70% by weight. Subsequently, both edges of the peeled web were held with clips and the web was dried at 130° C. for 10 minutes while the distance between the clips was fixed to prepare cellulose triacetate film 1 (TAC film 1) with a thickness of 80 µm.

The resulting TAC film 1 was wound around a core of a glass fiber reinforced resin with a diameter of 200 mm according to a taper tension method to form a film roll having a width of 1 m and a length of 1000 m. In this step, a 270° C. embossing ring was pressed onto the edges of the film for embossing treatment to give a height of 10 µm in order to prevent film adherence in the roll film. Thus, roll film was obtained.

Three cellulose triacetate film samples were taken from the central portion in the transverse direction of the roll film. Refractive indices nx, ny, and nz of the samples were measured in the same manner as above, and retardation in plane R0 and retardation in the thickness direction Rt of the sample were calculated. In the central portion of the samples, R0 was 2 nm, and Rt was 52 nm. The direction of the delayed phase axis of the samples was lower than the measurable limit, since R0 was extremely low. Further, the rate of water content of the samples was 1.3%.

<<Preparation of Comparative Film 2 (TAC Film 2)>>

Comparative film 2 (TAC film 2) was prepared in the same manner as in TAC film 1, except that the thickness was 41 µm.

Three cellulose triacetate film samples were taken from the central portion in the transverse direction of the film. Refractive indices nx, ny, and nz of the samples were measured in the same manner as above, and retardation in plane R0 and retardation in the thickness direction Rt of the sample were calculated. In the central portion of the samples, R0 was 1 nm, and Rt was 31 nm. The direction of the delayed phase axis of the samples was lower than the measurable limit, since R0 was extremely low. Further, the rate of water content of the samples was 3.9%.

<<Measurement of Other Properties of Cellulose Ester Film>>

(Rate of Water Content)

The cellulose ester film prepared above was cut into a 10 cm×10 cm film sample, subjected to humidity conditioning at 23° C. and at 80% RH for 48 hours, and the resulting sample had a weight of $W_1$. Subsequently, the sample was dried at 120° C. for 45 minutes, and the resulting sample had a weight of $W_2$. The rate of water content at 23° C. and at 80% RH was obtained from the following formula:

$$\text{Rate of water content (\%)} = \{(W_1 - W_2)/W_2\} \times 100$$

(Number of Luminescent Foreign Materials)

The cellulose ester film prepared above was inserted between two polarizing plates arranged in a crossed Nicol state to prepare a laminate. When light is projected from one side of the laminate, luminescent foreign materials are observed on the other side of the laminate as bright materials, employing a microscope. The number per 25 mm$^2$ of luminescent foreign materials with a size of not less than 5 µm were measured at ten areas of the laminate. The sum of the number was defined as the number per 250 mm$^2$ of luminescent foreign materials. The measurement was repeated 5 times and the average was defined as the number of luminescent foreign materials. The microscope was employed under conditions of a magnifying power of 30 and transmission light.

Properties of each cellulose ester film are shown in Table 1. In Table 1, cellulose ester film is abbreviated simply as film.

TABLE 1

| Film No. | RO (nm) | Rt (nm) | Acetyl substitution degree | Propionyl substitution degree | Total acyl substitution degree | Stretching magnification | Stretching temperature (° C.) | * Residual solvent (%) | Drying temperature (° C.) | Rate of water content | Number of luminescent foreign materials |
|---|---|---|---|---|---|---|---|---|---|---|---|
| 1 | 88 | 205 | 2.00 | 0.80 | 2.80 | 1.65 | 110 | 25 | 120 | 1.8 | 64 |
| 2 | 47 | 132 | 1.90 | 0.75 | 2.65 | 1.40 | 110 | 30 | 125 | 1.8 | 48 |
| 3 | 85 | 210 | 1.60 | 1.20 | 2.80 | 1.50 | 100 | 25 | 120 | 2.1 | 52 |
| 4 | 93 | 227 | 2.00 | 0.80 | 2.80 | 1.55/ MD1.05 | 120 | 20 | 130 | 1.6 | 67 |
| 5 | 44 | 136 | 1.90 | 0.75 (butyryl) | 2.65 | 1.40 | 115 | 30 | 120 | 1.3 | 51 |
| 6 | 43 | 126 | 2.00 | 0.80 | 2.80 | 1.55 | 110 | 25 | 120 | 1.1 | 29 |
| 7 | 102 | 163 | 2.30 | 0.50 | 2.80 | MD1.70 | 155 | 12 | 130 | 2.0 | 77 |
| TAC1 | 2 | 52 | 2.92 | 0 | 2.92 | 1.07 | — | — | 120 | 1.8 | 65 |
| TAC2 | 1 | 31 | 2.92 | 0 | 2.92 | 1.07 | — | — | 120 | 3.9 | 34 |

* Residual solvent shows one at the beginning of stretching.

(Preparation of Polarizing Plate Sample 1) A 120 µm thick polyvinyl alcohol film was immersed in an aqueous solution comprised of 1 part by weight of iodine, 2 parts by weight of potassium iodide, and 4 parts by weight of boric acid, and stretched at 50° C. by a factor of 4 to obtain a polarizing film. Subsequently, cellulose ester film 1 was laminated onto the polarizing film according to the following procedures to obtain a polarizing plate sample 1.

Figure 2:
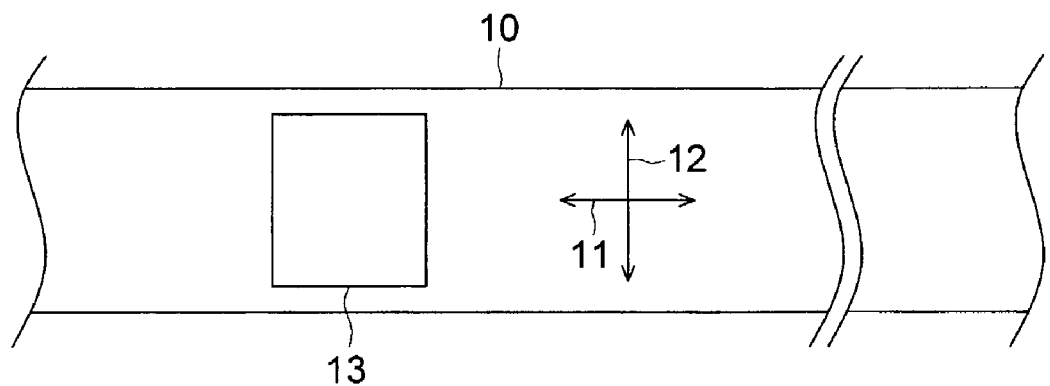
FIG. 2 is an illustration showing the cellulose ester film in the invention manufactured according to a cast film manufacture process.

(1) The cellulose ester film was cut in the form of a rectangle 13 as shown in FIG. 2 to obtain two sheets of cellulose ester film with a size of 15 cm×18 cm. The resulting sheets were immersed in an aqueous 2 mol/liter sodium hydroxide solution at 60° C. for 1 minute, washed with water, and dried to obtain two cellulose ester film samples as polarizing plate protective films.

FIG. 2 is a schematic view of a long length cellulose ester film in the invention manufactured according to a cast film manufacture process. In FIG. 2, numerical number 10 represents the cellulose ester film in the invention 10, an arrow 11 is a cast direction in the cast film manufacture process, and an arrow 12 is a transverse direction in the cast film manufacture process. The cellulose ester film used for a polarizing plate is for example, a cellulose ester film which is cut into the form of a rectangle 13, so that the side of the rectangle is in parallel with or normal to the transverse direction.

(2) The polarizing film obtained above was cut to obtain two cellulose ester film samples with the same size, and the resulting samples were immersed for 1 to 2 seconds in a polyvinyl alcohol adhesive with a solid content of 2% by weight.

Figure 3:
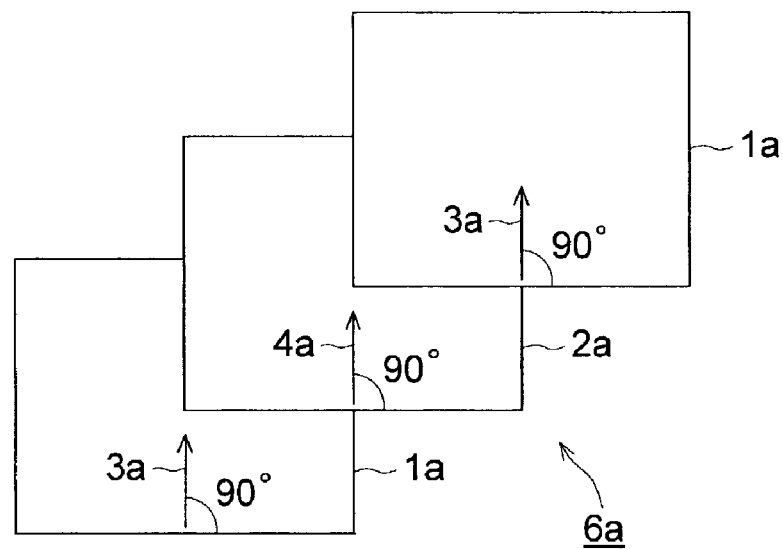
FIG. 3 is an illustration showing the constitution of the polarizing plate of the invention.

(3) Excessive adhesive being removed, one of the two cellulose ester film samples obtained above was laminated onto one surface of the resulting polarizing film, and the other was laminated onto the other surface of the resulting polarizing film, as shown in FIG. 3.

FIG. 3 shows a schematic view of the polarizing plate of the invention. The polarizing plate 6a is a polarizing plate in which a polarizing film 2a is provided between two of the cellulose ester film 1a in the invention. The cast direction 3a of the cellulose ester film 1a in the cast film manufacture process is in parallel with the stretching direction 4a of the polarizing film 2a.

(4) Pressure was applied through a hand roller to the laminate with the polarizing film and the cellulose ester film to remove foams or excessive adhesive from the ends of the laminate. The pressure applied by the hand roller was from 20 to 30 N/cm$^2$, and the roller speed was 2 m/min.

(5) The resulting laminate was dried at 80° C. for 2 minutes in a dryer. Thus, a polarizing plate sample 1 was obtained.

The resulting polarizing plate sample 1 (referred to also as viewing angle increasing polarizing plate sample 1) was incorporated into a vertical alignment type (VA type) liquid crystal cell according to the method described later, and evaluated for viewing angle.

(Preparation of Polarizing Plate Sample 2)

Polarizing plate sample 2 was prepared in the same manner as in polarizing plate sample 1, except that cellulose ester film 2 was used, and evaluated for viewing angle in the same manner as above.

(Preparation of Polarizing Plate Sample 3)

Polarizing plate sample 3 was prepared in the same manner as in polarizing plate sample 1, except that cellulose ester film 3 was used, and evaluated for viewing angle in the same manner as above.

(Preparation of Polarizing Plate Sample 4)

Polarizing plate sample 4 was prepared according to the following procedures employing comparative film 1 (cellulose triacetate film: TAC film 1) and cellulose ester film 4.

A 120 µm thick polyvinyl alcohol film was immersed in an aqueous solution comprised of 1 part by weight of iodine, 2 parts by weight of potassium iodide, and 4 parts by weight of boric acid, and stretched at 50° C. by a factor of 4 to obtain a polarizing film.

(1) TAC film and cellulose ester film were cut into a rectangle 13 as shown in FIG. 2, respectively, each size being 15 cm×18 cm, and the resulting films were immersed in an aqueous 2 mol/liter sodium hydroxide solution at 60° C. for 1 minute, washed with water, and dried to obtain a TAC film sample 1 and a cellulose ester film 4 as a polarizing plate protective film, respectively.

(2) The polarizing film obtained above was cut into the same size as the resulting polarizing plate protective film, and immersed for 1 to 2 seconds in a polyvinyl alcohol adhesive with a solid content of 2% by weight.

(3) Excessive adhesive being removed from the polarizing film, the TAC film sample 1 was laminated onto one surface of the resulting polarizing film and the cellulose ester film sample 4 was laminated onto the other surface of the resulting polarizing film, as shown in FIG. 3.

(4) Pressure was applied through a hand roller to the laminate with the polarizing film and the cellulose ester film to remove foams or excessive adhesive from the ends of the laminate. The pressure applied by the hand roller was from 20 to 30 N/cm$^2$, and the roller speed was 2 m/min.

(5) The resulting laminate was dried at 80° C. for 2 minutes in a dryer. Thus, a polarizing plate sample 4 was obtained.

The resulting polarizing plate sample 4 (referred to also as viewing angle increasing polarizing plate sample 4) was incorporated into a vertical alignment type (VA type) liquid crystal cell according to the method described later, so that the cellulose ester film 4 faced the glass plate of the liquid crystal cell, and evaluated for viewing angle.

(Preparation of Polarizing Plate Sample 5)

Polarizing plate sample 5 was prepared in the same manner as in polarizing plate sample 4, except that cellulose ester film 5 was used instead of cellulose ester film 4. The resulting polarizing plate sample 5 (referred to also as viewing angle increasing polarizing plate sample 5) was incorporated into a vertical alignment type (VA type) liquid crystal cell according to the method described later, so that the cellulose ester film 5 faced the glass plate of the liquid crystal cell, and evaluated for viewing angle.

(Preparation of Polarizing Plate Sample 6)

Polarizing plate sample 6 was prepared in the same manner as in polarizing plate sample 4, except that cellulose ester film 6 was used instead of cellulose ester film 4. The resulting polarizing plate sample 6 (referred to also as viewing angle increasing polarizing plate sample 6) was incorporated into a vertical alignment type (VA type) liquid crystal cell according to the method described later, so that the cellulose ester film 6 faced the glass plate of the liquid crystal cell, and evaluated for viewing angle.

(Preparation of Polarizing Plate Sample 7)

Polyvinyl alcohol with an average molecular weight of 3800 and a saponification degree of 99.5 mol % was dissolved in water to prepare a 5.0% by weight polyvinyl alcohol solution. The resulting solution was cast onto a polyethylene terephthalate film, dried, and peeled from the polyethylene terephthalate film to obtain a polyvinyl alcohol film. The polyvinyl alcohol film was immersed in an aqueous solution comprised of 2 g/liter of iodine and 60 g/liter of potassium iodide at 30° C. for 240 seconds, immersed in an aqueous solution comprised of 70 g/liter of boric acid and 30 g/liter of potassium iodide for 5 minutes for boric acid treatment while stretched by a factor of 4 in the transporting direction, and dried. Thus, a polarizing film was obtained.

The cellulose ester film 1 obtained above, which had been wound around a core of a glass fiber reinforced resin with a diameter of 200 mm to form a film roll having a width of 1 m and a length of 1000 m, was unwound from the roll, immersed in an aqueous 2 mol/liter sodium hydroxide solution at 60° C. for 1 minute, washed with water, and dried. The resulting saponificated cellulose ester film was continuously laminated (roll to roll) as a protective film through a polyvinyl alcohol type adhesive onto both sides of the polarizing film obtained above. The resulting laminate was cut into a rectangle 13 with a size of 15 cm×18 cm as shown in FIG. 2.

The resulting polarizing plate sample 7 (referred to also as viewing angle increasing polarizing plate sample 7) was evaluated for viewing angle in the same manner as in polarizing plate sample 1.

(Preparation of Comparative Polarizing Plate Sample 8A)

Comparative polarizing plate sample 8A was prepared in polarizing plate sample 1, except that comparative film 1 (TAC film 1) was used instead of the cellulose ester film 1, and evaluated for viewing angle in the same manner as in polarizing plate sample 1.

(Preparation of Comparative Polarizing Plate Sample 8B)

Comparative polarizing plate sample 8B was prepared in polarizing plate sample 1, except that comparative film 2 (TAC film 1) was used instead of the cellulose ester film 1, and evaluated for viewing angle in the same manner as in polarizing plate sample 1.

Constitution of the polarizing plate samples obtained above is collectively shown in Table 2.

TABLE 2

| Polarizing plate sample No. | Cellulose ester film No. provided on the surface of the polarizing film on the liquid crystal cell side | Cellulose ester film No. provided on the surface of the polarizing film opposite the liquid crystal cell |
|---|---|---|
| 1 | 1 | 1 |
| 2 | 2 | 2 |
| 3 | 3 | 3 |
| 4 | 4 | TAC 1 |
| 5 | 5 | TAC 1 |
| 6 | 6 | TAC 1 |
| 7 | 1 | 1 |
| 8A | TAC 1 | TAC 1 |
| 8B | TAC 2 | TAC 2 |

<<Preparation of Liquid Crystal Panel>>

A liquid crystal panel sample for measuring viewing angle was prepared as follows:

The polarizing plate of the liquid crystal panel of a 15 inch liquid crystal display VL-1530S, produced by Fujitsu Co., Ltd., was peeled from the liquid crystal cell, and each of polarizing plate samples 1 through 7, and comparative polarizing plate samples 8A and 8B was laminated on the glass plate of the crystal cell with a combination of the polarizing plate samples shown in Table 3. The lamination was carried out so that the cellulose ester film in the invention faced the glass plate of the liquid crystal cell and the absorption axis of the sample was in accordance with that of the polarizing plate before being peeled. Thus, liquid crystal panel samples 1 through 8 were obtained.

The viewing angle of the resulting crystal panel sample was measured employing an EZ-Contrast produced by ELDIM Co., Ltd. The viewing angle was represented by a range of an angle inclined to the direction normal to the plane of the liquid crystal panel, the angle range showing a contrast ratio between white/black display of 10 or more. The results are shown in Table 3.

Herein, the viewing angle shows a range of visual filed providing a contrast ratio between white/black display of 10 or more, and is represented by an angle providing a contrast ratio between white/black display of 10 or more, whose is bisected by the line normal to the plane of the liquid crystal panel.

TABLE 3

| Liquid crystal panel sample No. | Arrangement of polarizing plate sample | | Viewing angle (degree) | | Remarks |
|---|---|---|---|---|---|
| | Polarizing plate sample No. on the viewer side | Polarizing plate sample No. on the back light side | At upper, lower, left and right portions of the panel plane | In the oblique direction inclined at a 45° angle to the panel plane | |
| 1 | 1 | 8A | 160 (80 + 80) | 160 (80 + 80) | Inv. |
| 2 | 2 | 2 | 160 (80 + 80) | 160 (80 + 80) | Inv. |
| 3 | 8A | 3 | 160 (80 + 80) | 160 (80 + 80) | Inv. |
| 4 | 8B | 4 | 160 (80 + 80) | 160 (80 + 80) | Inv. |
| 5 | 5 | 5 | 160 (80 + 80) | 160 (80 + 80) | Inv. |
| 6 | 6 | 6 | 160 (80 + 80) | 160 (80 + 80) | Inv. |
| 7 | 8A | 1 | 160 (80 + 80) | 160 (80 + 80) | Inv. |
| 8 | 8B | 8A | 160 (80 + 80) | 120 (60 + 60) | Comp. |

Inv.: Invention,
Comp.: Comparative

As is apparent from Table 3, the inventive liquid crystal panel samples, employing the polarizing plate of the invention comprising the cellulose ester film in the invention, exhibited greatly increased viewing angle.

Example 2

Polarizing plate samples 9 through 14 were prepared according to the following procedures:

<<Preparation of Polarizing Plate Sample 9>>

(Preparation of Cellulose Ester Film TAC-A)

Cellulose ester film TAC-A was prepared according to the following procedures:

Cellulose triacetate (with an acetyl substitution degree of 2.92 and a viscosity average polymerization degree of 300) of 100 parts by weight, 2 parts by weight of ethylphthalylethyl glycolate, 8.5 parts by weight of triphenyl phosphate, 350 parts by weight of methylene chloride, and 50 parts by weight of ethanol were placed into a tightly sealed vessel, and gradually heated to 45° C. in 60 minutes while slowly stirred. Pressure in the vessel was 121 kPa. The resulting solution was filtered employing Azumi filter paper No. 244, produced by Azumi Roshi Co., Ltd., and allowed to stand for 24 hours to remove foams in the solution. Thus, a cellulose ester solution was prepared.

Five parts by weight of the cellulose triacetate described above, 3 parts by weight of TINUVIN 326 (produced by Ciba Specialty Co., Ltd.), 7 parts by weight of TINUVIN 109 (produced by Ciba Specialty Co., Ltd.), 5 parts by weight of TINUVIN 171 (produced by Ciba Specialty Co., Ltd.), and 1 part by weight of AEROSIL 200V (produced by NIPPON AEROSIL Co., Ltd.) were dissolved in a solvent of 90 parts by weight of methylene chloride and 10 parts by weight of ethanol. Thus, a UV absorber solution was obtained. One hundred parts by weight of the cellulose ester solution were mixed with 2 parts by weight of the UV absorber solution, and the mixture was stirred with a static mixer to prepare a dope. The dope of 35° C. was cast on a stainless steel belt support from a die coater, dried for 1 minute on the stainless steel whose the rear side was brought into contact with 35° C. water, and maintained for 15 seconds on the stainless steel cooled whose rear side was further brought into contact with a 15° C. chilled water to form a web. Then, the web was peeled the support.

The residual solvent content at the peeling of the web was 80% by weight. Subsequently, employing a tenter for stretching, both edges of the peeled web were held with clips and the distance between the clips was changed so that the web was stretched at 105° C. only in the transverse direction at a stretching magnification of 1.07. The stretched web was dried at 130° C. for 10 minutes while transported on the rollers to prepare cellulose ester film TAC-A with a thickness of 80 μm.

Polarizing plate sample 9 was prepared in the same manner as in polarizing plate sample 1 of Example 1, except that cellulose ester film 2 and cellulose ester film TAC-A obtained above were used.

Liquid crystal panel sample 9 was prepared in the same manner as in Example 1, except that polarizing plate sample 9 obtained above (hereinafter referred to as polarizing plate sample 9 before accelerated aging treatment) was used. The polarizing plate sample 9 was subjected to accelerated aging treatment in which the sample was allowed to stand at 80° C. and 90% RH for 500 hours (hereinafter referred to as polarizing plate 9 after accelerated aging treatment), and liquid crystal panel sample 9' was prepared in the same manner as in Example 1, except that polarizing plate 9 after accelerated aging treatment was used. Viewing angle of the resulting panel samples was measured in the same manner as above.

<<Preparation of Polarizing Plate Sample 10>>

Cellulose ester film TAC-B was prepared in the same manner as in cellulose ester film TAC-A above, except that the web was stretched in the transverse direction at a stretching magnification of 1.15.

Polarizing plate sample 10 was prepared in the same manner as in polarizing plate sample 9 above, except that the cellulose ester film TAC-B obtained above was used. Liquid crystal panel sample 10 was prepared in the same manner as in liquid crystal panel sample 9, except that polarizing plate sample 10 obtained above (hereinafter referred to as polarizing plate 10 before accelerated aging treatment) was used. The polarizing plate sample 10 was subjected to accelerated aging treatment in the same manner as above (hereinafter referred to as polarizing plate 10 after accelerated aging treatment), and liquid crystal panel sample 10' was prepared in the same manner as above, except that polarizing plate 10 after accelerated aging treatment was used. Viewing angle of the resulting panel samples was measured in the same manner as above.

<<Preparation of Polarizing Plate Sample 11>>

Cellulose ester film TAC-C was prepared in the same manner as in cellulose ester film TAC-A above, except that the web was stretched in the transverse direction at a stretching magnification of 1.20.

Polarizing plate sample 11 was prepared in the same manner as in polarizing plate sample 9 above, except that the cellulose ester film TAC-C obtained above was used. Liquid crystal panel sample 11 was prepared in the same manner as in liquid crystal panel sample 9, except that polarizing plate sample 11 obtained above (hereinafter referred to as polarizing plate 11 before accelerated aging treatment) was used. The polarizing plate sample 11 was subjected to accelerated aging treatment in the same manner as above (hereinafter referred to as polarizing plate 11 after accelerated aging treatment), and liquid crystal panel sample 11' was prepared in the same manner as above, except that polarizing plate 11 after accelerated aging treatment was used. Viewing angle of the resulting panel samples was measured in the same manner as above.

<<Preparation of Polarizing Plate Sample 12>>

Cellulose ester film TAC-D was prepared in the same manner as in cellulose ester film TAC-A above, except that the web was stretched in the transverse direction at a stretching magnification of 1.02.

Polarizing plate sample 12 was prepared in the same manner as in polarizing plate sample 9 above, except that the cellulose ester film TAC-D obtained above was used. Liquid crystal panel sample 12 was prepared in the same manner as in liquid crystal panel sample 9, except that polarizing plate sample 12 obtained above (hereinafter referred to as polarizing plate 12 before accelerated aging treatment) was used. The polarizing plate sample 12 was subjected to accelerated aging treatment in the same manner as above (hereinafter referred to as polarizing plate 12 after accelerated aging treatment), and liquid crystal panel sample 12' was prepared in the same manner as above, except that polarizing plate 12 after accelerated aging treatment was used. Viewing angle of the resulting panel samples was measured in the same manner as above.

<<Preparation of Polarizing Plate Sample 13>>

Polarizing plate sample 13 was prepared in the same manner as in polarizing plate sample 9 above, except that the cellulose ester film TAC-A was turned 90° in plane and laminated onto the polarizing film. Liquid crystal panel sample 13 was prepared in the same manner as in liquid crystal panel sample 9, except that polarizing plate sample 13 obtained above (hereinafter referred to as polarizing plate 13 before accelerated aging treatment) was used. The polarizing plate sample 13 was subjected to accelerated aging treatment in the same manner as above (hereinafter referred to as polarizing plate 13 after accelerated aging treatment), and liquid crystal panel sample 13' was prepared in the same manner as above, except that polarizing plate 13 after accelerated aging treatment was used. Viewing angle of the resulting panel samples was measured in the same manner as above.

<<Preparation of Polarizing Plate Sample 14>>

Cellulose ester film TAC-E was prepared in the same manner as in cellulose ester film TAC-A above, except that the web was not stretched in the transverse direction.

Polarizing plate sample 14 was prepared in the same manner as in polarizing plate sample 9 above, except that the cellulose ester film TAC-E obtained above was used. Liquid crystal panel sample 14 was prepared in the same manner as in liquid crystal panel sample 9, except that polarizing plate sample 14 obtained above (hereinafter referred to as polarizing plate 14 before accelerated aging treatment) was used. The polarizing plate sample 14 was subjected to accelerated aging treatment in the same manner as above (hereinafter referred to as polarizing plate 14 after accelerated aging treatment), and liquid crystal panel sample 14' was prepared in the same manner as above, except that polarizing plate 14 after accelerated aging treatment was used. Viewing angle of the resulting panel samples was measured in the same manner as above.

The results are shown in Table 4.

TABLE 4

| Liquid crystal panel sample No. | Polarizing plate sample No. | Cellulose ester film No. provided on the surface of the polarizing film on the liquid crystal cell side | Cellulose ester film No. provided on the surface of the polarizing film opposite the liquid crystal cell | Viewing angle (degree) | | | | Remarks |
|---|---|---|---|---|---|---|---|---|
| | | | | L | R | U | L | |
| 9 | 9 | 2 | TAC-A | 64 | 64 | 28 | 27 | No |
| 9' | 9 | 2 | TAC-A | 64 | 64 | 27 | 28 | deterioration |
| 10 | 10 | 2 | TAC-B | 65 | 65 | 27 | 27 | No |
| 10' | 10 | 2 | TAC-B | 65 | 65 | 28 | 26 | deterioration |
| 11 | 11 | 2 | TAC-C | 65 | 65 | 27 | 27 | Slight |
| 11' | 11 | 2 | TAC-C | 61 | 60 | 28 | 25 | deterioration |
| 12 | 12 | 2 | TAC-D | 65 | 65 | 27 | 27 | Slight |
| 12' | 12 | 2 | TAC-D | 62 | 62 | 25 | 27 | deterioration |

TABLE 4-continued

| Liquid crystal panel sample No. | Polarizing plate sample No. | Cellulose ester film No. provided on the surface of the polarizing film on the liquid crystal cell side | Cellulose ester film No. provided on the surface of the polarizing film opposite the liquid crystal cell | Viewing angle (degree) | | | | Remarks |
|---|---|---|---|---|---|---|---|---|
| | | | | L | R | U | L | |
| 13 | 13 | 2 | TAC-A (MD) | 65 | 65 | 27 | 27 | Little deterioration |
| 13' | 13 | 2 | TAC-A (MD) | 65 | 65 | 28 | 26 | |
| 14 | 14 | 2 | TAC-E) | 65 | 65 | 27 | 27 | A small Deterioration |
| 14' | 14 | 2 | TAC-E | 55 | 57 | 23 | 23 | |

L: Left portion;
R: Right portion;
U: Upper portion;
L: Lower portion

As is apparent from Table 4, the polarizing plate samples 9 through 14 comprising the cellulose ester film in the invention provided greatly increased viewing angle.

It has been confirmed that the polarizing plate in the invention comprising cellulose ester film (provided on the surface of the polarizing film opposite the liquid crystal cell), which does not have a phase difference function but is stretched at a specific stretching magnification, provides improved dimensional stability.

The polarizing plate samples 9 through 14 comprised cellulose ester film 2, which had been stretched at a stretching magnification of 1.40, on one surface of the polarizing film. Curling of the polarizing plate samples 9 through 14 after the accelerated aging treatment was visually evaluated. As a result, curling due to dimensional change was observed in the polarizing plate sample 14 comprising TAC-E, which had not been stretched. Curling was reduced in the polarizing plate sample comprising TAC-D, which had been stretched at a stretching percentage of 2%, or in the polarizing plate sample comprising TAC-C, which had been stretched at a stretching percentage of 20%. Curling was scarcely observed in the polarizing plate sample comprising TAC-B, which had been stretched at a stretching percentage of 15%, or in the polarizing plate sample comprising TAC-A, which had been stretched at a stretching percentage of 7%.

[Effect of the Invention]

The present invention can provide a polarizing plate having high resistance to heat or humidity, high strength, and minimized foreign materials, and giving wide viewing angle, and can provide a liquid crystal display employing the polarizing plate.

What is claimed is:

1. A polarizing plate used in a vertical alignment mode liquid crystal display comprising a liquid crystal cell, the polarizing plate comprising a polarizing film and a mixed fatty acid cellulose ester film with optical biaxiality provided between the polarizing film and the liquid crystal cell, the mixed fatty acid cellulose ester of the mixed fatty acid cellulose ester film having a total acyl substitution degree of from more than 1.5 to 2.8 and an acetyl substitution degree of less than 2.0, wherein the mixed fatty acid cellulose ester film has a retardation in plane R0 of from 31 to 120 nm, and a retardation in the thickness direction Rt of from 60 to 300 nm, in which R0 is represented by the following formula (1) and Rt is represented by the following formula (2):

$$R0 = (nx - ny) \times d \quad \text{formula (1)}$$

$$Rt = \{(nx + ny)/2 - nz\} \times d \quad \text{formula (2)}$$

wherein nx is refractive index in plane of the film in a first direction giving a maximum refractive index, ny is refractive index in plane of the film in a second direction normal to the first direction, nz is refractive index in the thickness direction of the film, and d is thickness (nm) of the film.

2. The polarizing plate of claim 1, wherein the mixed fatty acid cellulose ester film has a retardation in plane R0 of from 31 to 60 nm, and a retardation in the thickness direction Rt of from 90 to 200 nm.

3. The polarizing plate of claim 2, wherein the mixed fatty acid cellulose ester film has a retardation in plane R0 of from 31 to 50 nm, and a retardation in the thickness direction Rt of from 110 to 150 nm.

4. The polarizing plate of claim 1, wherein the mixed fatty acid cellulose of the mixed fatty acid cellulose ester film has an acetyl group and a propionyl group in the ester bond.

5. The polarizing plate of claim 4, wherein the mixed fatty acid cellulose ester has a total acyl substitution degree of from 1.5 to 2.3, and a propionyl substitution degree of from 0.6 to 1.2.

6. The polarizing plate of claim 1, wherein the mixed fatty acid cellulose ester of the mixed fatty acid cellulose ester film has an acetyl group and a butyryl group in the ester bond.

7. The polarizing plate of claim 1, wherein the mixed fatty acid cellulose ester film has a thickness of from 30 to 110 μm.

8. The polarizing plate of claim 1, wherein when the mixed fatty acid cellulose ester film is arranged in a crossed Nicol state, and luminescent foreign materials are observed, the number of luminescent foreign materials with a size of from 5 to 50 μm is not more than 150 per 250 mm² of the film, and the number of luminescent foreign materials with a size exceeding 50 μm is zero per 250 mm² of the film.

9. The polarizing plate of claim 1, wherein the mixed fatty acid cellulose ester film is manufactured by a process comprising the steps of giving optical biaxiality to a long length mixed fatty acid cellulose ester film, and winding the resulting film around a spool to obtain a long length roll film.

10. The polarizing plate of claim 1, wherein the polarizing plate is manufactured by a process comprising the steps of:
  giving optical biaxiality to a long length mixed fatty acid cellulose ester film;
  treating the film to give a maximum refractive index in the transverse direction of the film;
  winding the resulting film around a spool to obtain a roll film;
  providing a polarizing film containing a dichroic substance; and
  laminating the polarizing film with the roll film.

11. The polarizing plate of claim 10, wherein the optical biaxiality giving step is a step in which the long length mixed fatty acid cellulose ester film is stretched in the transverse direction of the film when it has a residual solvent content of not less than 10% by weight during manufacture.

12. The polarizing plate of claim 1, wherein the mixed fatty acid cellulose ester film contains 1 to 30 parts by weight of at least one plasticizer selected from the group consisting of a phosphate compound, a fatty acid ester compound, a citrate compound, and a phthalate compound based on 100 parts by weight of the cellulose ester.

13. The polarizing plate of claim 1, wherein the mixed fatty acid cellulose ester film contains 0.005 to 0.3 parts by weight of particles having an average particle size of not more than 0.1 μm, based on 100 parts by weight of the cellulose ester.

14. The polarizing plate of claim 1, wherein the mixed fatty acid cellulose ester film contains 0.8 to 3.0 parts by weight of a UV absorber based on 100 parts by weight of the cellulose ester.

15. A polarizing plate used in a vertical alignment mode liquid crystal display comprising a liquid crystal cell, the polarizing plate comprising a polarizing film and a mixed fatty acid cellulose ester film with optical biaxiality provided between the polarizing film and the liquid crystal cell, the mixed fatty acid cellulose ester film being provided on a first surface of the polarizing film, a cellulose ester film being provided on a second surface of the polarizing film opposite the mixed fatty acid cellulose ester film, and the stretching direction of the mixed fatty acid cellulose ester film being in accordance with that of the cellulose ester film, wherein the mixed fatty acid cellulose ester film has a retardation in plane R0 of from 31 to 120 nm, and a retardation in the thickness direction Rt of from 60 to 300 nm, in which R0 is represented by the following formula (1) and Rt is represented by the following formula (2):

$$R0 = (nx - ny) \times d \quad \text{formula (1)}$$

$$Rt\{(nx+ny)/2 - nz\} \times d \quad \text{formula (2)}$$

wherein nx is refractive index in plane of the film in a first direction giving a maximum refractive index, ny is refractive index in plane of the film in a second direction normal to the first direction, nz is refractive index in the thickness direction of the film, and d is thickness (nm) of the film.

16. The polarizing plate of claim 15, wherein cellulose triacetate film is provided on the surface of the polarizing film opposite the mixed fatty acid cellulose ester film.

17. The polarizing plate of claim 15, wherein the angle formed between the orientation direction of a dichroic substance in the polarizing film and the direction giving a maximum refractive index in plane of the mixed fatty acid cellulose ester film is in the range of from 80° to 100°.

18. The polarizing plate of claim 15, wherein the angle formed between the orientation direction of a dichroic substance in the polarizing film and the direction giving a maximum refractive index in plane of the mixed fatty acid cellulose ester film is in the range of from 0 to 10°.

19. The polarizing plate of claim 15, wherein the cellulose ester film provided on the second surface of the polarizing film has been stretched in the transverse direction during or after manufacture.

20. The polarizing plate of claim 19, wherein the cellulose ester film provided on the second surface of the polarizing film has been stretched at a stretching magnification of from 1.01 to 1.2.

21. The polarizing plate of claim 20, wherein the cellulose ester film provided on the second surface of the polarizing film has been stretched at a stretching magnification of from 1.05 to 1.15.

* * * * *